US011743334B2

(12) United States Patent
Mendez Rodriguez et al.

(10) Patent No.: US 11,743,334 B2
(45) Date of Patent: Aug. 29, 2023

(54) IN-VEHICLE DISTRIBUTED COMPUTING ENVIRONMENT

(71) Applicant: Amazon Technologies, Inc., Seattle, WA (US)

(72) Inventors: Edwin Ricardo Mendez Rodriguez, Seattle, WA (US); Brett Francis, Redwood City, CA (US); David Joseph Mifsud, Lake Stevens, WA (US); Michael Garcia, Springfield, MO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/219,711

(22) Filed: Mar. 31, 2021

(65) Prior Publication Data
US 2022/0321655 A1 Oct. 6, 2022

(51) Int. Cl.
*H04L 29/08* (2006.01)
*H04L 67/12* (2022.01)
*B60R 16/023* (2006.01)
*H04L 67/10* (2022.01)

(52) U.S. Cl.
CPC ............ *H04L 67/12* (2013.01); *B60R 16/023* (2013.01); *H04L 67/10* (2013.01)

(58) Field of Classification Search
CPC ........ H04L 67/12; H04L 67/10; B60R 16/023
See application file for complete search history.

(56) References Cited

U.S. PATENT DOCUMENTS

| 8,705,527 | B1 | 4/2014 | Addepalli et al. |
| 9,280,653 | B2 | 3/2016 | Forest |
| 9,854,442 | B2 | 12/2017 | Mazzara, Jr. |
| 10,120,665 | B1 | 11/2018 | Sunarno |
| 10,534,368 | B2 | 1/2020 | Sethu |
| 11,314,495 | B2 | 4/2022 | Francis et al. |

(Continued)

FOREIGN PATENT DOCUMENTS

| WO | 2020047016 | 5/2020 |
| WO | 2020210729 A1 | 10/2020 |

OTHER PUBLICATIONS

U.S. Appl. No. 17/037,376, filed Sep. 29, 2020, Michael Garcia, et al.

(Continued)

*Primary Examiner* — Kim T Nguyen
(74) *Attorney, Agent, or Firm* — Alexander A. Knapp; Kowert, Hood, Munyon, Rankin & Goetzel, P.C.

(57) ABSTRACT

A system comprising one or more computers implements a synthetic sensor service configured to deploy synthetic sensors to in-vehicle computing devices implementing an in-vehicle distributed computing environment. A synthetic sensor may be placed monolithically at a single computing device (e.g. ECU) in the vehicle, or may be modularly placed on multiple computing devices (e.g. multiple ECUs) of the vehicle that each have resources or inputs that the synthetic sensor requires. The modular components of the synthetic sensor may execute in a runtime environment of the in-vehicle distributed computing environment, such that the modular components function as a unified synthetic sensor even though they are placed on different computing devices of the vehicle (e.g. different ECUs).

22 Claims, 20 Drawing Sheets

(56) References Cited

U.S. PATENT DOCUMENTS

| | | | |
|---|---|---|---|
| 2007/0109138 | A1 | 5/2007 | Farrell |
| 2015/0207859 | A1 | 7/2015 | Lu |
| 2016/0099806 | A1 | 4/2016 | Racklyeft et al. |
| 2016/0314224 | A1 | 10/2016 | Wei et al. |
| 2016/0330032 | A1 | 11/2016 | Naim et al. |
| 2016/0349400 | A1 | 12/2016 | Chen et al. |
| 2018/0041416 | A1 | 2/2018 | Dorum |
| 2018/0046869 | A1 | 2/2018 | Cordell et al. |
| 2018/0077376 | A1* | 3/2018 | Armeni .................. G06T 19/20 |
| 2018/0266856 | A1 | 9/2018 | Broadley et al. |
| 2018/0373266 | A1 | 12/2018 | Sethu |
| 2019/0179979 | A1 | 6/2019 | Melick |
| 2019/0283529 | A1 | 9/2019 | Macneille |
| 2019/0302259 | A1 | 10/2019 | Van Fleet et al. |
| 2020/0062269 | A1 | 2/2020 | Vardharajan |
| 2020/0074266 | A1 | 3/2020 | Peake et al. |
| 2020/0089487 | A1 | 3/2020 | Ramic et al. |
| 2020/0184231 | A1* | 6/2020 | Viswanathan ..... G01C 21/3647 |
| 2021/0019457 | A1 | 1/2021 | Brown et al. |
| 2021/0286923 | A1 | 9/2021 | Kristensen |
| 2022/0078077 | A1 | 3/2022 | Misfud et al. |
| 2022/0080913 | A1 | 3/2022 | Abaza |
| 2022/0147337 | A1 | 5/2022 | Michelsohn |
| 2022/0161744 | A1* | 5/2022 | Vangoethem ....... B60R 16/0231 |
| 2022/0261601 | A1 | 8/2022 | Amato |

OTHER PUBLICATIONS

Sami, Hani, et al. "Vehicular-OBUs-as-on-Demand-Fogs: Resource and Context Aware Deployment of Containerized Micro-Services", IEEE /ACM Transactions on Networking, Mar. 11, 2020, pp. 778-790, vol. 28, No. 2, New York, NY, US.

Esen, Hasan, et al., "Control as a Service (CaaS): Cloud-based Software Architecture for Automotive Control Applications," Proceedings of the Second International Workshop on the Swarm at the Edge of the Cloud [Online], Apr. 13, 2015, pp. 13-18, New York, NY, USA, ISBN: 978-1-4503-3595-9; Retrieved from the Internet: URL:https://dl.acm.org/doi/pdf/10.1145/2756755.2756758 [Nov. 11, 2021].

Mattias Ohrn, "Publice Key Infrastructure Utilisation in Digital Rights Management", KTH Numerical Analysis and Computer Science, 2004, pp. 1-84.

Lili Zhang et al., "A DRM System Based on PKI", 2010 Fourth International Conference on Genetic and Evolutionary Computing, IEEE, 2010, pp. 522-525.

U.S. Appl. No. 16/581,571, filed Sep. 24, 2019, Michael Christopher Wenneman et al.

U.S. Appl. No. 16/453,921, filed Jun. 26, 2019, Marco Argenti.

U.S. Appl. No. 16/835,070, dated Mar. 30, 2020, Brett Francis.

U.S. Appl. No. 17/014,742, dated Sep. 8, 2020, David Joseph Mifsud.

Sayfan, Gigi, "Mastering Kubemetes," May 17, 2017, Packt Publishing Ltd., Birmingham UK.

International Search Report and Written Opinion dated Jun. 24, 2022 in PCT/US2022/022516, Amazon Technologies, Inc., 17 pages.

Youn J. et al: "Heuristic resource allocation and scheduling method for distributed automotive control systems", International Journal of Automotive Technology, [Online] Jul. 28, 2013 vol. 14, No. 4, pp. 611-624, Heidelberg; Retrieved from the Internet: URL:https://link.springer.com/content/pdf/10.1007/12239-013-0066-3.pdf.

* cited by examiner

| OEM A- Vehicle Control Console | Current Date: Nov-12, 2021 |
|---|---|
| Model Year Selected: 2009, 2010, 2011 | Effective Date: Jan 1, 2022 |
| Platform: B-IVI1.2 | Termination Date: N/A |
| Trim: Premium, Premium plus | |

[Test] [Deploy]

Sensor Access | System Access | Compute Unit Control

| | 1P Apps | 2P Apps | 3P Apps | Autosar Apps | Manual Selection |
|---|---|---|---|---|---|
| Vehicle Safety Sensors | ○ | ○ | ○ | ● | Select Apps |
| Forward Facing Camera Sensor | ● | ● | ○ | ● | Select Apps |
| Rear Facing Camera Sensor | ● | ● | ○ | ● | Select Apps |
| Side Collision Warning Sensor | ● | ○ | ○ | ● | Select Apps |
| ABS Event Sensor | ○ | ○ | ○ | ● | Select Apps |
| Air Bag Deployment Sensor | ○ | ○ | ○ | ● | Select Apps |
| Interior Cabin Sensors | ● | ○ | ○ | ● | Select Apps |
| Seat Weight Sensors | ● | ● | ○ | ● | Select Apps |
| Driver Facial Camera Sensor | ● | ○ | ○ | ● | Select Apps |
| Cabin Temperature Sensor | ● | ● | ● | ● | Select Apps |
| Vehicle Status Sensors | ○ | ○ | ○ | ● | Select Apps |
| Fuel Level Sensor | ● | ● | ● | ● | Select Apps |
| Battery Level Sensor | ● | ○ | ○ | ● | Select Apps |
| Engine Temperature Sensor | ○ | ○ | ○ | ● | Select Apps |
| GPS Sensor | ● | ● | ● | ● | Select Apps |
| Speed and Heading Sensor | ● | ○ | ○ | ● | Select Apps |

Synthetic Sensor Processing Requirements

○ [Logic Placed @ ECU w/ GPU]

⋮

● [Logic Placed @ ECU w/ multi-core processor]

Synthetic Sensor Placement Requirements

○ Enable automated synthetic sensor placement re-shuffling?

● Enable modular synthetic sensor deployment?

○ [(Customer-Specified Placement Rules)]

FIG. 8

IN-VEHICLE DISTRIBUTED COMPUTING ENVIRONMENT

BACKGROUND

Modern vehicles, such as cars, trucks, motorcycles, etc. are often manufactured with electronic sensors and include computer systems (e.g. electronic control units (ECUs)) programmed with control algorithms that take inputs from such electronic sensors to determine various control actions to be taken for the vehicle or systems implemented in the vehicle. In order to guarantee a high level of safety, such sensors and control algorithms are rigorously tested and certified to meet different performance levels, such as automotive safety integrity levels (ASIL levels). For example, depending on the criticality of a sensor or an algorithm, a higher or lower certification level may be required.

Vehicles often include multiple ECUs. For example, in some vehicles a radio may be part of an entertainment operating system domain that is implemented using a first ECU, while sensors for seat belts and air bags may be included in a safety operating system domain that requires a high ASIL certification level and that is implemented using a second ECU.

Also, different ECUs included in a vehicle may have different capabilities or capacities as compared to other ECUs in the vehicle. For example, some ECUs may include more processors and/or more powerful processors than other ECUs. Likewise some ECUs may have access to different sensor inputs than other ECUs.

BRIEF DESCRIPTION OF THE DRAWINGS

FIG. 8 illustrates an example client console of a synthetic sensor service, according to some embodiments.

Figure 1:
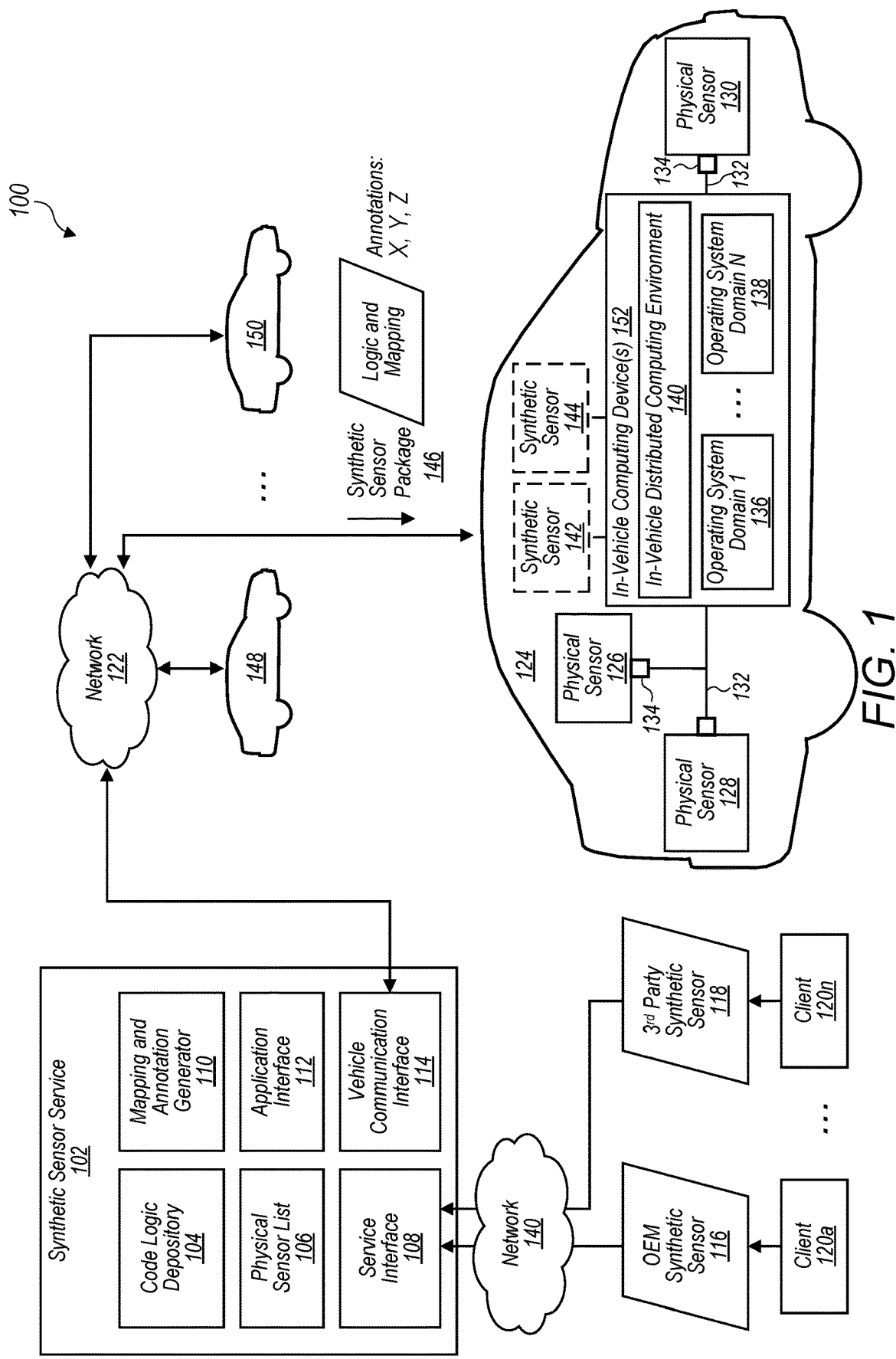
FIG. 1 illustrates a synthetic sensor service that receives instructions for deploying synthetic sensors from clients of the synthetic sensor service and that remotely causes synthetic sensors to be deployed to vehicles, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a synthetic sensor service and implementing an in-vehicle distributed computing environment for executing synthetic sensors in vehicles. For example a vehicle manufacturer, a vehicle parts manufacturer, or another third party may develop new applications that use new types of synthetic sensors and may deploy such new types of applications and/or synthetic sensors into vehicles that have already been sold to consumers. The deployment of the synthetic sensors may be achieved remotely over a network connection between the synthetic sensor service and the vehicle, wherein a set of in-vehicle computing devices (e.g. electronic control units (ECUs)) of the vehicle implement an in-vehicle distributed computing environment which may comprise multiple full or limited synthetic sensor orchestration environments that further perform configuration operations to enable required input data to flow to the new synthetic sensor (or modular components thereof) from existing physical sensors, ECUs, or from other synthetic sensors in the vehicle. A synthetic sensor orchestration environment may also performs configuration operations to enable output data from the synthetic sensor to flow to output destinations for the synthetic sensor. The synthetic sensor may be placed in the in-vehicle distributed computing environment as a monolithic synthetic sensor placed in a single synthetic sensor orchestration environment of a given ECU of the vehicle, or the synthetic sensor may be modularly placed, wherein the synthetic sensor is divided into modular components that execute in a runtime environment of the in-vehicle distributed computing service. The modular components of the synthetic sensor may be placed in different synthetic sensor orchestration environments of different ECUs that are all connected via the in-vehicle distributed computing environment. In some situations, allowing the synthetic sensor to be placed at multiple ECUs via the modular synthetic sensor components connected via the run-time environment, may provide a better placement than would be case if the synthetic sensor was placed at a single ECU. For example, the synthetic sensor may require processing capabilities and input requirements that are not available at any single ECU, but that are available in part at different respective ECUs. Thus, the modular deployment may allow the synthetic sensor to be placed on ECUs meeting its requirements.

Additionally, in some embodiments, in addition to, or instead of, using the synthetic sensor service to deploy synthetic sensors to vehicles that have already been made available for use by operators of the vehicles, a client, such as a vehicle manufacturer, may use the synthetic sensor service to deploy synthetic sensors to a vehicle during the manufacturing process for the vehicle. For example, during a portion of the manufacturing process for the vehicle, after an on-board computing system has been installed and connected to a communication bus of the vehicle, synthetic sensors may be deployed to a synthetic sensor orchestration environment in order to perform quality assurance tests for electronic systems of the vehicle and/or provide output data from synthetic sensors for use in manufacturing and testing the vehicle.

In some embodiments, a system includes a plurality of electronic control units (ECUs) installed, or configured to be installed, in a vehicle. One or more of the ECUs store program instructions for implementing an in-vehicle distributed computing environment. The program instructions, when executed on the one or more ECUs, cause a processor of at least one of the ECUs to receive a synthetic sensor package for deployment in the vehicle, wherein the synthetic sensor package comprises logic for a synthetic sensor and mappings for the synthetic sensor. The program instructions further cause the processor of the at least one ECU to determine a placement location for the synthetic sensor based on respective availabilities of data inputs for the mappings of the synthetic sensor package at respective ones of the ECUs and based on respective resource capacities of the respective ECUs to execute the logic included in the synthetic sensor package. Additionally, the program instructions cause the processor of the at least one ECU to place the synthetic sensor as two or more modular components placed on two or more different ones of the respective ECUs, wherein the two or more modular components collectively implement the synthetic sensor in the in-vehicle distributed computing environment.

For example, the two or more modular components may include a logic module placed at a first ECU of the vehicle and an input module placed at a second ECU of the vehicle, wherein the logic module implements logic included in the synthetic sensor package and the input module provides the logic module with data inputs according to the mappings associated with the synthetic sensor. The logic module and the input module execute in a run-time environment of the in-vehicle distributed computing environment. For example, a communication layer of the in-vehicle distributed computing environment may encode partial work results (such as input data received from the input module) and communicate the partial work results to other components executing in the run-time environment, such as the logic module, implemented at the second ECU. In some embodiments, the first ECU where the input module is placed may have access to data inputs that are not available at the second ECU where the logic module is placed. Likewise the first ECU may lack processing capabilities, capacity, or priorities that are available at the second ECU where the logic module is placed. Thus, by dividing the synthetic sensor into a logic module and an input module, placement may be achieved at multiple ECUs such that the synthetic sensor has access to required data inputs and also has access to required computing capability, capacity, or priority.

In some embodiments, the input module may be placed at an ECU that implements a full or limited synthetic sensor orchestration environment. However, both the full and limited synthetic sensor orchestration environment may be included in ECUs that offer vehicle services that include a platform abstraction layer, a hardware abstraction layer, and a vehicle abstraction layer. Thus, the vehicle services of the full or limited synthetic sensor orchestration environment may abstract away particular specific configuration details such that synthetic sensors (either monolithic or comprising modular components) may be placed in such full or limited synthetic sensor orchestration environments using standard synthetic sensor packages, without having to custom code each synthetic sensor to meet particular vehicle requirements (e.g. formatting or encoding requirements specific to a particular vehicle manufacturer or vehicle model), to meet particular platform requirements (e.g. formatting or encoding requirements specific to a particular vehicle domain or bus), or to meet particular hardware requirements (e.g. hardware driver interface requirements, etc.). Instead, the vehicle services components of the full or limited synthetic sensor orchestration environments may take care of these details via the platform abstraction layer, the hardware abstraction layer, and the vehicle abstraction layer. Furthermore, the full or limited synthetic sensor orchestration environments implemented in different ECUs may be connected to one another via the in-vehicle distributed computing environment, such that limiting boundaries such as hardware capacity or capability limits of particular ECUs, or such as input limitations regards which types of inputs respective ECUs have access to, can be overcome by deploying synthetic sensors in a modular fashion at respective ECUs that meet the needs of the synthetic sensors, and wherein a runtime environment of the in-vehicle distributed computing environment allows for seamless flow of work between the modules of the modularly placed synthetic sensor.

Additionally, in some embodiments an in-vehicle distributed computing environment may be connected to a virtual ECU, wherein the virtual ECU appears as another ECU of the vehicle but is actually implemented using remote hardware, such as at an edge location or at a data center of a service provider network. For example, the virtual ECU may function as a virtual machine for the vehicle (e.g. cloud compute resource). In some embodiments, an ECU of the vehicle may implement an interface to the virtual ECU. In some embodiments, a virtual domain control unit may also be connected to an in-vehicle distributed computing network, wherein the virtual domain control unit (DCU) implements an additional vehicle domain using remote hardware such as in an edge location or a data center of a provider network. Note the virtual ECU and the virtual DCU may function as a cloud computing resource available to be used for placement of synthetic sensors, of logic modules of modularly placed synthetic sensors, or both, in some embodiments.

In some embodiments, one or more non-transitory, computer-readable storage media, store program instructions that, when executed on or across one or more computing devices, cause the one or more computing devices to receive a synthetic sensor package comprising logic for a synthetic sensor and mappings for the synthetic sensor. The program instructions also cause the one or more computing devices to determine a placement location for the synthetic sensor based on respective availabilities of data inputs for the mappings of the synthetic sensor at respective placement locations in the in-vehicle distributed computing environment and respective resource capacities or capabilities of the respective placement locations in the in-vehicle distributed computing environment. Additionally, the program instructions cause the one or more computing devices to place the synthetic sensor as two or more modular components placed at two or more different ones of the placement locations in the in-vehicle distributed computing environment, wherein the two or more modular components collectively implement the synthetic sensor in the in-vehicle distributed computing environment.

In some embodiments, a method includes receiving a synthetic sensor package at an in-vehicle distributed computing environment of a vehicle, wherein the synthetic sensor package comprises logic for a synthetic sensor and a mapping for the synthetic sensor. The method further includes determining a placement location for the synthetic sensor based on respective availabilities of data inputs for the mappings of the synthetic sensor at respective placement locations in the in-vehicle distributed computing environment and respective resource capacities of the respective placement locations in-vehicle distributed computing environment. Additionally, the method includes placing the synthetic sensor as two or more modular components placed at two or more different ones of the placement locations in the in-vehicle distributed computing environment, wherein the two or more modular components collectively implement the synthetic sensor in the in-vehicle distributed computing environment.

Vehicles are often manufactured with electronic sensors and computing devices that execute control algorithms that take sensor data from the electronic sensors as inputs to the control algorithms. However, communication interfaces for electronic sensors used in vehicles often vary between different vehicle manufacturers and even vary amongst different models manufactured by the same vehicle manufacturer. Additionally, electronic sensors and associated control algorithms are often implemented as separate systems that serve a particular purpose for the vehicle, but that are not configured to share sensor data with other systems of the vehicle. For example, an entertainment system of a vehicle may be implemented with electronic sensors, such as volume controls, but may not be configured to share sensor data with other systems of the vehicle. In some instances, this is done because separate systems of a vehicle have different certification requirements, such that the separate systems are kept separate and certified separately based on separate hardware requirements and separate control algorithm requirements.

Also, vehicles are often manufactured with fixed algorithms and rules for sharing sensor data, such that it is burdensome and/or time consuming to change the fixed algorithms or rules for sharing sensor data. For example, the algorithms and rules for sharing data are often determined during the design phase of the vehicle and cannot be changed after the vehicle has been manufactured, or may require physically changing out parts, such as computing devices, to change the fixed algorithms or rules for sharing sensor data.

Likewise, vehicles are often manufactured with separate ECUs, each having its own computing capacity, which is often specially designed for a particular purpose. While the ECUs may be enabled to communicate with one another, for example via a CAN bus. The computing capacities and capabilities of the ECUs are effectively siloed. For example, if applications executing at a first ECU require more or faster computing than is available at the first ECU, the applications are not able to utilize spare computing capacity of other ECUs in the vehicle. In a similar manner if an application is to execute on a given ECU, the application may be restricted to data inputs available at the given ECU, or may not be able to access the data inputs at a same sampling rate at a second ECU as would be available at the first ECU. Thus, not only may compute capacity be siloed at different ECUs, availability of data input may also be siloed. However, by implementing an in-vehicle distributed computing environment that allows synesthetic sensors to be placed at different ECUs and connected via execution in a shared runtime environment, these silo boundaries may be overcome.

As another example, a synthetic sensor service may provide one or more synthetic sensor packages to a vehicle during a manufacturing process of the vehicle subsequent to installation in the vehicle of one or more computing devices storing program instructions for implementing a synthetic sensor orchestration environment. The one or more synthetic sensors may be configured to generate outputs used to test the vehicle during the manufacturing process. For example, the synthetic sensors may test other components of the vehicle to determine the components are properly installed and configured in the vehicle.

Moreover, in some embodiments, a synthetic sensor service and/or an in-vehicle distributed computing environment may provide a uniform deployment mechanism for synthetic sensors to be placed into vehicles with varying interfaces. For example, synthetic sensor orchestration environments in different types of vehicles may include interfaces that allow or disallow sensor data to flow from physical sensors in the different types of vehicles, but may be configured to receive common synthetic sensor packages deployed from a synthetic sensor service. For example, a first vehicle manufacturer and a second vehicle manufacturer may use different types of seat weight sensors that have different communication interfaces. However, a synthetic sensor orchestration environment in each of the different types of vehicles may be configured to receive a common synthetic sensor package and locally determine a placement of the synthetic sensor and configuration operations that need to be taken to allow data from existing sensors to flow to the new synthetic sensor. Thus, a third party developer may develop a single version of a synthetic sensor and use a synthetic sensor service to deploy the new synthetic sensor into synesthetic sensor orchestration environments in multiple different types of vehicles having varying sensor communication interfaces, wherein placement is determined locally in the respective synthetic sensor orchestration environments by an orchestration component of an in-vehicle distributed computing environment of the vehicle.

Additionally, in some embodiments, a synthetic sensor package that is to be deployed from a synthetic sensor service to a synthetic sensor orchestration environment in a vehicle may include one or more annotations that are outside of an envelope of the synthetic sensor package that envelopes the control logic and mappings for the new synthetic sensor. Such annotations may be used by an orchestration component of an in-vehicle distributed computing environment to determine a placement for the new synthetic sensor. Additionally, the annotations may be used by the orchestration component to further determine effects the placement of the new synthetic sensor in a particular system domain will have on other synthetic sensors. For example, a newly placed synthetic sensor may provide an output that is listed in an annotation of another synthetic sensor as an optional input, wherein the presence of the optional input allows the other synthetic sensor to be upgraded to a higher certification level, or to otherwise provide more reliable outputs.

For example, the annotations may be included in a synthetic sensor package as metadata that is external from the code itself (e.g. logic elements and mappings) of the new synthetic sensor. Thus an orchestration component of an in-vehicle distributed computing environment may read the annotations included in metadata of the synthetic sensor package to determine a placement decision for the new synthetic sensor without having to parse the code (e.g. logic elements and mappings) of the new synthetic sensor that is included within the envelope to determine a placement decision.

In some embodiments, a synthetic sensor may include code that uses sensor data from existing sensors to determine a new synthetic sensor output. Also, in some embodiments, a synthetic sensor may include one or more machine learning models that use sensor data from existing sensors to determine a new synthetic sensor output. For example, a machine learning model may be a logic element of a synthetic sensor, wherein physical sensor inputs or other inputs are mapped to the machine learning model and an output of the machine learning model is further used by the synthetic sensor to determine an output of the synthetic sensor.

In some embodiments, an OEM manufacturer, an OEM parts manufacturer, and/or a third-party developer may develop new applications for a vehicle that use new types of synthetic sensors. In such embodiments, a client may purchase a new application from an application store, and the application store may provide a suggestion to an OEM of the vehicle to instruct a synthetic sensor service to deploy one or more synthetic sensor packages to the vehicle of the client in order to implement the purchased new application. In some embodiments, a synthetic sensor service and respective synthetic sensor orchestration environments in different vehicles may provide a consistent perspective for controlling sensor data to be used in updated code after the vehicle has been manufactured and/or put into service by a consumer. For example, a synthetic sensor orchestration environment may enable sensor data to be shared horizontally in a vehicle as opposed to being limited to multiple separate vertically oriented control domains. Additionally, an in-vehicle distributed computing environment may enable compute capacity, capabilities, priorities, etc. to be shared horizontally in a vehicle as opposed to being limited to multiple separate vertically oriented control domains.

For example, an OEM manufacturer, an OEM parts manufacturer, or another third-party may use a console of a synthetic sensor service to develop new synthetic sensors. The developer of the synthetic sensor (e.g. OEM manufacturer, OEM parts manufacturer, or third-party) may select sensor data to use as inputs for the synthetic sensor from a list of sensor data types available from existing sensors. The developer may also select logic elements such as algorithms (e.g. rules) or models (e.g. machine learning models) to receive selected inputs. The developer may further determine mappings between the inputs, the logic elements (e.g. the rules and/or the models), to an output of the new synthetic sensor. In some embodiments, the mappings may be represented as JSON objects or XML code, wherein a synthetic sensor orchestration environment in a vehicle to which a package for the new synthetic sensor is deployed parses the JSON objects or XML code to determine relationships between inputs, logic elements (e.g. rules and/or models), and outputs. The synthetic sensor orchestration environment may then cause one or more configuration operations to take place to implement the logic elements (e.g. rules and/or models) mapped to in the code logic of the synthetic sensor package. The synthetic sensor orchestration environment may further cause one or more additional configuration operations to be taken to allow sensor data to flow to components of the synthetic sensor according to the mapping included in the code logic of the synthetic sensor package. In some embodiments, the logic elements and mapping may be included in an enveloped environment and one or more annotations stored as metadata of the synthetic sensor package (outside of the envelope) may indicate characteristics of the synthetic sensor such as required inputs, optional inputs, outputs, certification levels, synthetic sensor dependencies, failure modes, etc.

Additionally, in some embodiments, an OEM manufacturer, an OEM parts manufacturer, or another third-party may use a console of a synthetic sensor service to define processing capacities, capabilities, or priorities for a given synthetic sensor. For example, the synthetic sensor service customer (e.g. OEM manufacturer, OEM parts manufacturer, or other third-party) may specify that the synthetic sensor is to be provided access to a graphics processing unit (GPU), generally purpose graphics processing unit (GGPU), particular type of central processing unit (CPU), be allocated at least a minimum amount of processing resources, and/or have a specified priority to placement location resources as compared to other applications executing at the placement location (e.g. ECU.)

In some embodiments, an OEM manufacturer, an OEM parts manufacturer, or another third party may use a service interface that includes the console or that is separate from the synthetic sensor design console to instruct the synthetic sensor service to deploy one or more synthetic sensors to a particular vehicle or class of vehicles that qualify to receive the synthetic sensor. For example, an OEM manufacturer, an OEM parts manufacturer, or another third party may require a consumer to purchase an upgrade package in order to have access to new types of features that are enabled using new types of synthetic sensors.

In some embodiments, synthetic sensors may be developed and controlled by an OEM manufacturer and/or an OEM parts manufacturer to guarantee synthetic sensors deployed to vehicles manufactured by the OEM or OEM parts manufacturer satisfy particular quality and/or certification requirements. While in other embodiments, other third parties may be enabled to develop and deploy new types of synthetic sensors into vehicles manufactured by another party, such as the OEM or multiple different OEMs.

In some embodiments, various domains or operating systems included in a vehicle may include an infotainment domain/OS, a cockpit or control domain/OS, a communications domain/OS, a safety system domain/OS, a vehicle server domain/OS, a telematics communication unit domain/OS, an advanced drive assistance system domain/OS, a cloud domain/OS, an edge processing domain/OS (which may be implemented in part in a cellular communications tower, etc.), and/or a gateway domain/OS. The vehicle may include a common communications bus, but the different domains may be separate branches off of the bus, or data flowing over the bus may not be accessible in all of the domains.

In some embodiments, a synthetic sensor orchestration environment may provide an output from a synthetic sensor to another vehicle system outside of the synthetic sensor orchestration environment. In some embodiments, the other vehicle system may take one or more control actions based on the output received from the synthetic sensor. For example, if the synthetic sensor is a synthetic sensor that determines whether or not a passenger is seated in the front seat, an output of the synthetic sensor may be provided to a vehicle system outside of the synthetic sensor orchestration environment, such as a front seat adjustment mechanism controller, wherein the front seat adjustment mechanism controller causes the front seat to automatically move forward if no one is sitting in the front seat such that passengers in the back seat have more leg room.

In some embodiments, a synthetic sensor orchestration environment may provide an output from a synthetic sensor to a remote system outside of the vehicle. For example, a portion of an infotainment system for a vehicle may be implemented remotely using cloud-based resources and the output of the synthetic sensor may be provided to a cloud provider outside of the vehicle. As an example, an output of a "child seated in vehicle?" synthetic sensor may be provided to a remote server that customizes media content to be provided to the vehicle, wherein different customizations of the media content may be performed based on whether or not a child is seated in the vehicle.

FIG. 1 illustrates a synthetic sensor service that receives instructions for deploying synthetic sensors from clients of the synthetic sensor service and that remotely causes synthetic sensors to be deployed to vehicles that each respectively include an in-vehicle synthetic sensor orchestration environment, according to some embodiments.

In some embodiments, a synthetic sensor service for vehicles, such as synthetic sensor service 102, is configured to receive instructions for defining new synthetic sensors from clients, such as clients 120a through 120n, via a network, such as network 140. In some embodiments, clients 120a through 120n may include vehicle original equipment manufacturers (e.g. vehicle OEMs), vehicle parts original equipment manufacturers (e.g. parts OEMs), or third parties, such as application developers, etc.

In some embodiments, a synthetic sensor service 102 may generate a synthetic sensor package 146 based on the instructions received from any one of the clients 120a through 120n and deploy the synthetic senor package to a synthetic sensor orchestration environment 140 of one or more vehicles, such as vehicles 124, 148, 150, etc., via a network 122. For example, network 122 may be a wireless network, such as a cellular, satellite or other network that allows data communications between the synthetic sensor service 102 and an in-vehicle computing system 152 that implements a synthetic sensor orchestration environment 140.

In some embodiments, a synthetic sensor service, such as synthetic sensor service 102, may include a code logic depository 104, a physical sensor list 106, a service interface 108, a mapping and annotation generator 110, an application interface 112, and a vehicle communication interface 114.

Figure 6:
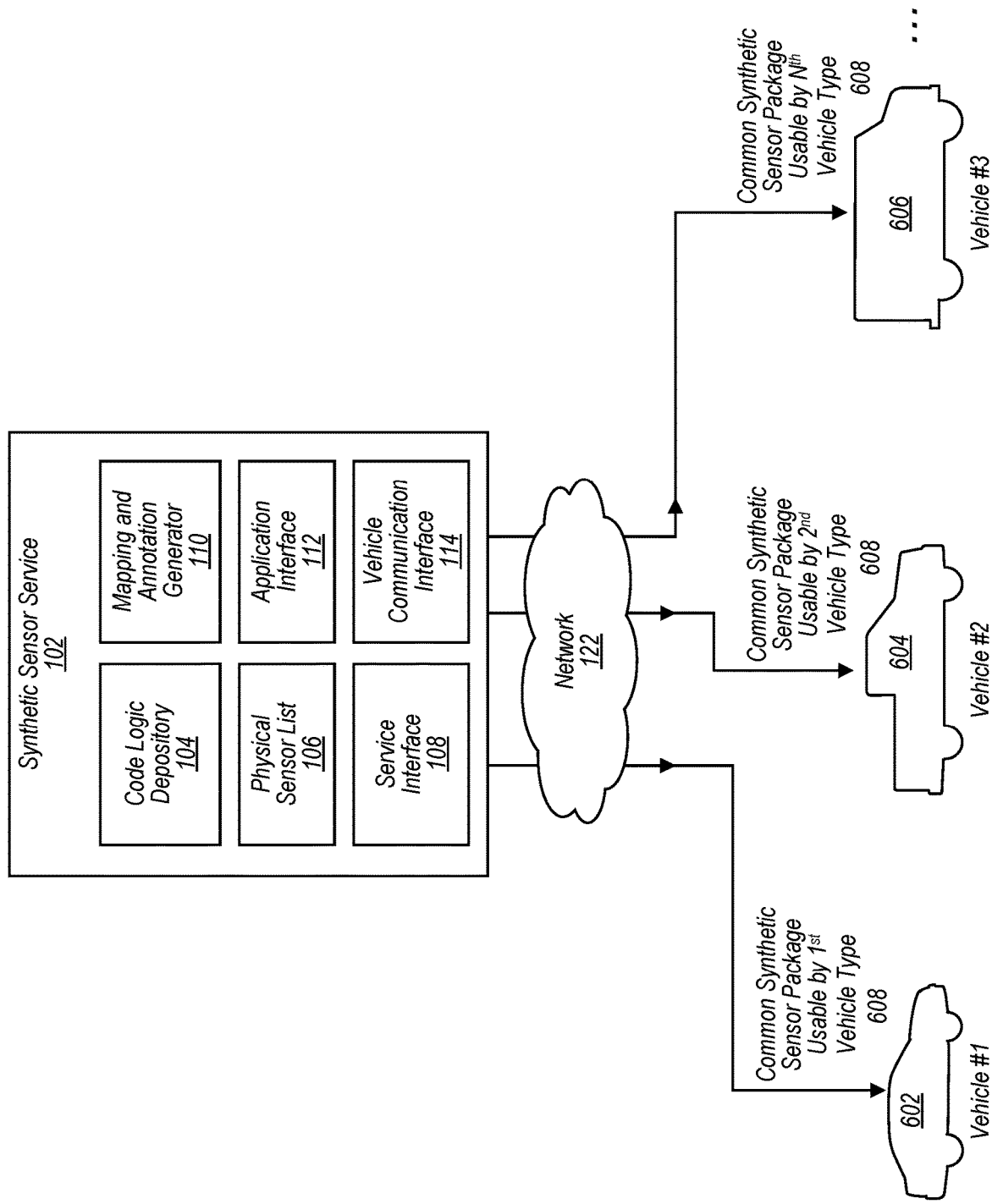
FIG. 6 illustrates a synthetic sensor service that is configured to deploy a common synthetic sensor package to varying types of vehicles, according to some embodiments.

In some embodiments, the service interface of a synthetic sensor service, such as service interface 108, may implement a service console, such as shown in FIG. 6, an application programmatic interface configured to receive synthetic sensor instructions from clients 120a through 120n, a command line interface, a graphical user interface, or other suitable interface that enables clients to select and/or design new synthetic sensors to be deployed to vehicles that include synthetic sensor orchestration environments. Note in some embodiments, a vehicle, such as vehicle 124, may be manufactured to include synthetic sensor orchestration environment 140 at the time of manufacture, wherein the synthetic sensor orchestration environment 140 enables new synthetic sensors to be deployed to vehicle 124 subsequent to manufacture and subsequent to being put into use by an owner or operator of the vehicle 124.

In some embodiments, a console implemented by service interface 108 may provide clients 120 with available sensors included in a vehicle that may be used to design a new synthetic sensor. For example, physical sensor list 106 may store updated lists of available sensors that are included in various types of vehicles that subscribe to the synthetic sensor service 102. Also, a console implemented by service interface 108 may provide clients with available rules, models, etc. that may be used to design a synthetic sensor. For example, code logic depository 104 may store logic elements such as available rules, models, etc. that may be used to define code logic for a new synthetic sensor. Additionally, in some embodiments clients may submit client generated rules, models, etc. to be used in a new synthetic sensor. In some embodiments, service interface 108 may provide a "drag and drop" graphical user interface (GUI), wherein a client drags and drops logic elements, such as rules models, etc. to be used in a new synthetic sensor and further defines a data flow through the new synthetic sensor by drawing lines connecting inputs to the logic elements and further connecting the logic elements to one or more outputs of the synthetic sensor. In some embodiments, a client may select from pre-defined logic elements to drag and drop to define a new synthetic sensor, or the client may provide a client defined logic element to drag and drop and to further connect with other code elements, inputs, outputs, etc. to define a new synthetic sensor.

In some embodiments, mapping and annotation generator 110 may then generate a synthetic sensor package as defined by the client via service interface 108. In some embodiments, the client may specify annotations to be included with the synthetic sensor package, or mapping and annotation generator 110 may automatically determine annotations based on the synthetic sensor definition received via service interface 108.

In some embodiments, an application may request a synthetic sensor be deployed in order to enable the application to be implemented in a vehicle and application interface 112 may receive such a request.

In some embodiments, vehicle communication interface 114 may establish a network connection with in-vehicle computing device(s) 152 and may transmit synthetic sensor package 146 to synthetic sensor orchestration environment 140 for deployment.

In some embodiments, a vehicle such as any of vehicles 124, 148, 150, etc. may include one or more in-vehicle computing devices 152 that implement one or more operating system domains, such as operating system domains 136 through 138. Additionally, in-vehicle computing devices 152 may implement in-vehicle distributed computing environment 140 that spans one or more operating system domains, such as operating system domains 136 and 138. In some embodiments, each operating system domain may be implemented on a separate in-vehicle computing device (e.g. ECU), or may be implemented on a common in-vehicle computing device. Also, in some embodiments, in-vehicle distributed computing environment 140 may be implemented on a same in-vehicle computing device as one or more of the operating system domains, or may be implemented on a separate in-vehicle computing device that interfaces with other in-vehicle computing devices implementing the respective operating system domains 136 through 138. Also, in some embodiments, a vehicle may include a communication bus 132 that connects the in-vehicle computing devices 152 to physical sensors, such as physical sensors 126, 128, and 130. In some embodiments, one or more different types of interfaces 134 may connect the physical sensors to the communication bus 132. Also, in some embodiments, synthetic sensor in-vehicle distributed computing environment 140 may implement one or more synthetic sensors, such as synthetic sensors 142 and 144. In some embodiments the synthetic sensors may be implemented in a particular operating system domain, or may be allowed to communicate with other portions of the vehicle via a communication bus, such as communication bus 132. Additionally, synthetic sensors 142, 144, etc. may be implemented in in-vehicle distributed computing environment 140 as modularly placed synthetics sensors, such as including one or more input modules and one or more logic modules placed on different ECUs in different ones of operating system domains 136 through 138.

Figure 2:
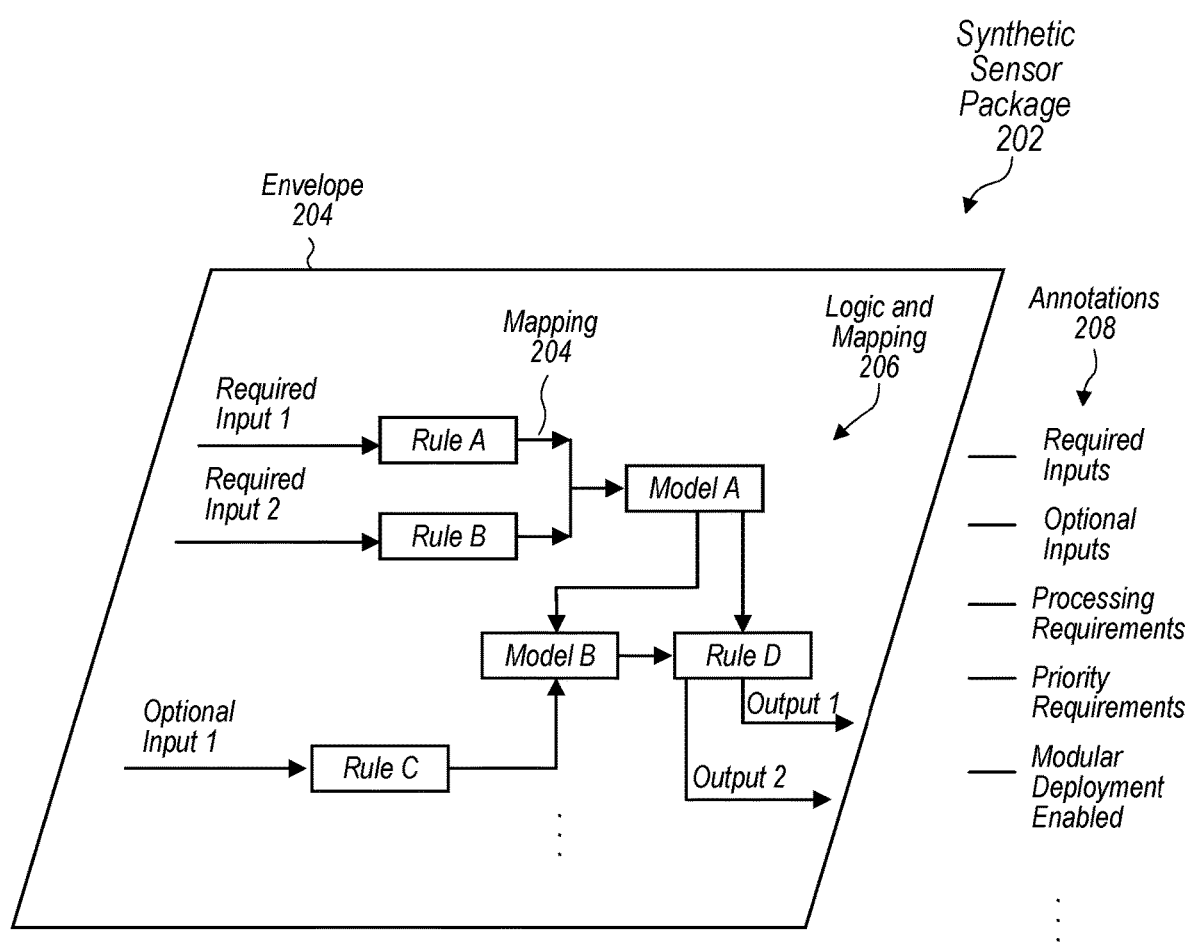
FIG. 2 illustrates a more detailed view of a synthetic sensor package that may be deployed from a synthetic sensor service to an in-vehicle distributed computing environment, wherein the synthetic sensor packages includes code logic and mappings in an envelope of the synthetic sensor package and that also includes annotations for the synthetic sensor outside of the envelope, according to some embodiments.

FIG. 2 illustrates a more detailed view of a synthetic sensor package that may be deployed from a synthetic sensor service to an in-vehicle distributed computing environment, wherein the synthetic sensor packages includes code logic and mappings in an envelope of the synthetic sensor package and that also includes annotations for the synthetic sensor outside of the envelope, according to some embodiments.

In some embodiments, a synthetic sensor package, such as synthetic sensor package 146 described in FIG. 1, may include a similar format as described in FIG. 2 for synthetic sensor package 202.

Synthetic sensor package 202 includes an envelope 204 that envelopes code defining logic and mapping 206. Also, outside of the envelope 104, synthetic sensor package 202 includes annotations 208. In some embodiments, annotations may include required inputs for a synthetic sensor, optional inputs for the synthetic sensor, processing requirements for the synthetic sensor, priority requirements for the synthetic sensor in regard to ECU resources, certification level(s) of the synthetic sensor, failure contingency plans for the synthetic sensor, dependency chains for the synthetic sensor, etc. In some embodiments, a failure contingency plan may indicate an alternative input to be used by the synthetic sensor if a particular required or optional input is not available. As another example, a failure contingency plan may indicate that a modular component of the synthetic sensor is to be replicated/re-generated and placed at a back-up ECU in response to failure at an ECU where the modular component is originally placed. Also, the certification levels and/or failure contingency plans may indicate different certification levels to be attributed to the synthetic sensor based on how many required and/or optional inputs are available. Also, a certification level for a synthetic sensor may depend on a domain in which the synthetic sensor is implemented. For example, hardware used in a safety domain may be more robust than hardware used in an entertainment domain. Thus, in order to achieve a higher level of certification the synthetic sensor may need to be implemented in a domain that includes more robust hardware that meets requirements for a given certification level.

In some embodiments, logic elements, such as rules A, B, C, and D and models A and B may have been selected from a code logic depository 104 as described in FIG. 1. Also, in some embodiments one or more of rules A, B, C, or D or models A or B may have been provided by a client 120. Mappings 204 may define data flow between the required and optional inputs, the outputs, and the rules A, B, C, and D and models A and B. In some embodiments a client may draw the lines for mappings 204 using service interface 108 to define a synthetic sensor type.

In some embodiments, annotations 208 may additionally indicate that the synthetic sensor output is an input to another type of synthetic sensor and/or may indicate that an output from another type of synthetic sensor is a required or optional input to the given synthetic sensor. In some embodiments, the annotations may indicate a particular operating system domain in which the synthetic sensor is to be deployed. For example, to achieve a particular certification level the synthetic sensor may need to be deployed in an operating system domain with hardware or processes that satisfy requirements of the particular certification level. Additionally, the annotations may indicate that the logic module of a modularly placed synthetic sensor is to be placed in a specific operating system domain to achieve a particular certification level, while an input module is to be placed in another specific operating system domain that has inputs required by the synthetic sensor. As yet another example, the annotations may include an indication that modular deployment is enabled for the synthetic sensor being placed, wherein an orchestration environment will select a monolithic deployment, if modular deployment is not enabled. Also, in other embodiments, modular deployment may be enabled by default and an annotation of a synthetic sensor package may indicate monolithic deployment is required. Also, as further described in FIG. 8, in some embodiments, a customer (e.g. OEM, third-party parts supplier, etc.) requesting/designing the synthetic sensor package may specify a deployment strategy (e.g. monolithic versus modular). Also, the customer may specify requirements for the placement of a logic module of a modularly placed synthetic sensor. In such embodiments, the requirements for the logic module may be indicated in the annotations. In a similar manner, the customer may specify input redundancies, which may restrict placements of input modules, such requirements may also be indicated in the annotations.

Also annotations, such as annotations 208, may indicate that when one or more optional inputs are available the given synthetic sensor can be upgraded to a higher certification level. In some embodiments, a synthetic sensor orchestration service may scan annotations of already implemented synthetic sensors when a new synthetic sensor is added to determine if the new synthetic sensor is an optional input to one or more of the already implemented synthetic sensors. Also, the synthetic sensor orchestration environment may automatically change a placement of one or more synthetic sensors (e.g. re-shuffle the synthetic sensors) such that given ones of the synthetic sensors can be upgraded to higher certification levels by taking advantage of the output of the newly added synthetic sensors as an input to the one or more already implemented synthetic sensors. In some embodiments, the upgrade of a given synthetic sensor certification level may further allow other synthetic sensors to be upgraded by receiving an input (output from the upgraded synthetic sensor) that complies with a higher certification level.

Figure 3:
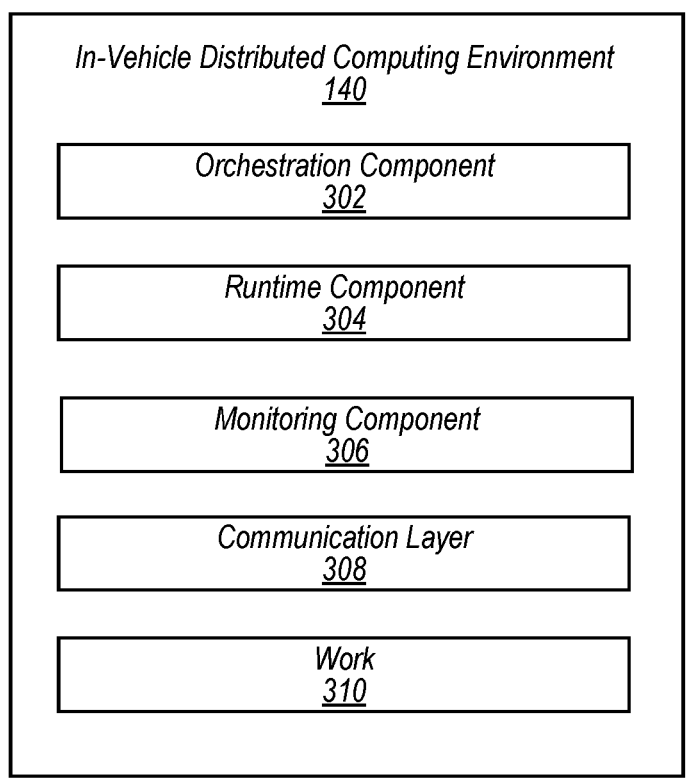
FIG. 3 is a block diagram illustrating components of an in-vehicle distributing computing environment framework, according to some embodiments.

FIG. 3 is a block diagram illustrating components of an in-vehicle distributing computing environment framework, according to some embodiments.

In some embodiments, the in-vehicle distributed computing environment, such as in-vehicle distributed computing environment 140 illustrated in FIG. 1, may include an orchestration component 302 that determines placement of synthetic sensors and modules of synthetic sensors, a runtime component 304 in which modules of synthetic sensors execute, a monitoring component 306 that provides interfaces for collecting status and capability information from computing devices of the in-vehicle distributed computing environment, such as ECUs. Additionally, the in-vehicle distributed computing environment 140 includes a communication layer 308 that provides protocols and encoding for sending communications between components of the in-vehicle distributed computing environment 140. Also, in-vehicle distributed computing environment 140 includes work 310, which may be tasks of a job performed by different modular components of a modularly placed synthetic sensors that executes in a runtime environment provided by runtime component 304.

In some embodiments, runtime component 302 is responsible for switching execution environments, facilitating the execution of work 310, transmitting partial results between modular components, aggregating incoming partial results, etc.

In some embodiments, monitoring component 306 is responsible for reporting ECU capacities, capabilities, priorities, etc. to orchestration component 302.

In some embodiments, communication layer 308 enables communication protocols to connect ECUs with the virtual orchestration component 302 and allows for work 310 (including partial results) to be communicated between modular components of a synthetic sensor.

The orchestration component 302 is implemented on one of the ECUs of the in-vehicle distributed computing environment, but is agnostic as to which ECU it is placed on. For example, the orchestration component 302 may place an incoming synthetic sensor on a same ECU that hosts the orchestration component 302 or another ECU of the in-vehicle distributed computing environment. Moreover, the orchestration component, may place the synthetic sensor based on annotations indicated for the synthetic sensor package and based on status information provided by monitoring component 306. The orchestration component 302 may keep a global view of the state of the ECUs of the in-vehicle distributed computing environment 140 and may assign work to respective ECUs based on this global view and the respective requirements of the work.

In some embodiments, work 310 is a stateless algorithm that needs to be executed at a given ECU connected to the in-vehicle distributed computing environment 140.

In some embodiments, the in-vehicle distributed computing environment 140 provides a framework that defines interfaces when ECUs join the framework and obtains agreement from the ECUs to send health data (e.g. capacity information, capability information, status information, etc.) via monitoring component 306. In some embodiments, the communication layer 308 may be over a CAN bus of the vehicle, a Flex-Ray bus, or other suitable bus of the vehicle, such as Ethernet bus, etc. In some embodiments, a bus may maintain a diagnostic index, such that the monitoring component 306 does not necessarily have to report diagnostic information to orchestration component 302, but instead ensure that orchestration component 302 has access to the diagnostic index, such as may be maintained by another entity, such as the bus.

Figure 4A:
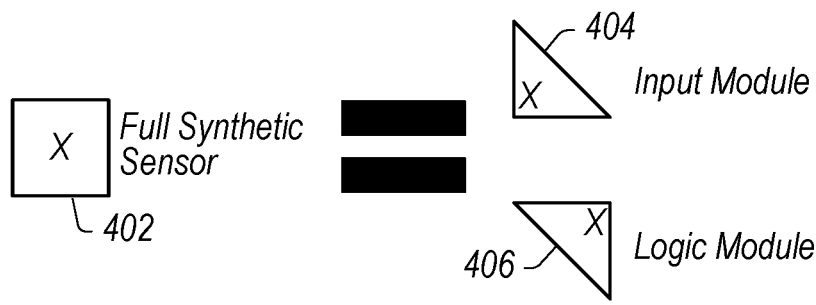
FIG. 4A is a block diagram illustrating modular components that may make up a full synthetic sensor, according to some embodiments.

FIG. 4A is a block diagram illustrating modular components that may make up a full synthetic sensor, according to some embodiments.

As discussed herein, a synthetic sensor may be placed monolithically, as a full synthetic sensor, as shown for synthetic sensor 402, or may be placed as a plurality of modular components such as input module 404 and logic module 406.

Figure 4B:
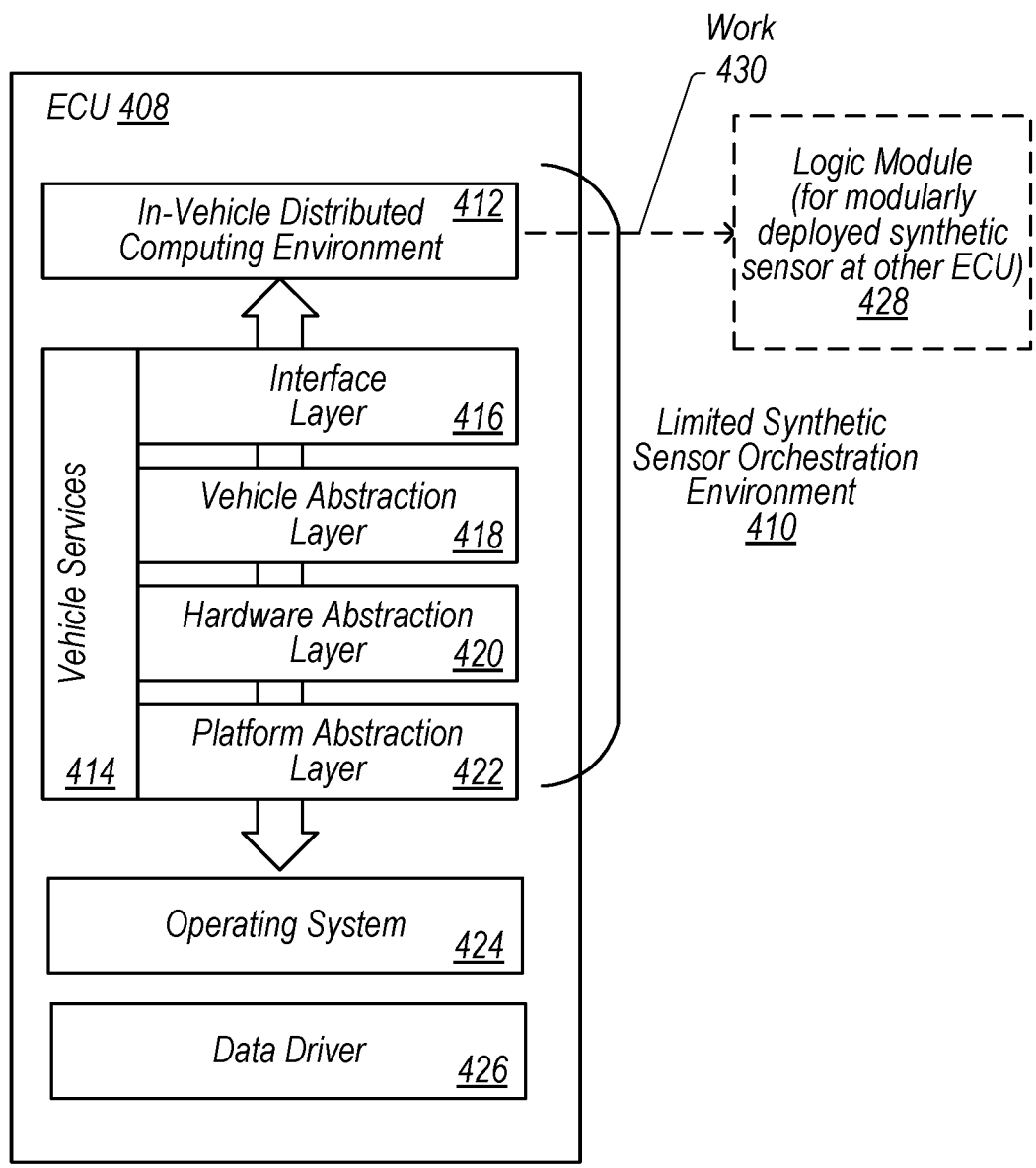
FIG. 4B is a block diagram illustrating a computing stack for an example electronic control unit (ECU) that implements a limited synthetic sensor orchestration environment and that is connected to an in-vehicle distributed computing environment, according to some embodiments.

FIG. 4B is a block diagram illustrating a computing stack for an example electronic control unit (ECU) that implements a limited synthetic sensor orchestration environment and that is connected to an in-vehicle distributed computing environment, according to some embodiments.

As an example of a limited synthetic sensor orchestration environment 410, ECU 408 may include vehicle services 414 that provide a platform abstraction layer 422, a hardware abstraction layer 420, and a vehicle abstraction layer 418, and an interface layer 416. The vehicle services 414 may provide the abstraction layers such that details of the operating system 424 and data drivers 426 of the ECU 408 are abstract away at the interface layer 416 that interfaces with the in-vehicle distributed computing environment 412. For example, work 430 passed into in-vehicle distributed computing environment 412 via interface layer 416 and directed to logic module 428 may be according to a communication protocol of the communication layer 308 of the in-vehicle distributed computing environment 412. In this way another ECU receiving the work can interpret the work without any need for specialized information regarding encoding protocols, etc. used by operating system 424 or data drivers 426. For example, a synthetic sensor/synthetic sensor module may access raw sensor data via an application programmatic interface (API) provided by the vehicle services 414, that is accessible to any synthetic sensor (e.g. the synthetic sensor does not need to be specially coded to communicate with the API).

As an example, a synthetic sensor that wants to access GPS data may be written to simply call an API for GPS data, wherein the synthetic sensor can be coded in a way that will work regardless of underlying details that may vary between vehicles or vehicle operating systems. Due to the vehicle services 414, synthetic sensor code is portable across different vehicle platforms, makes, models, etc.

Figure 4C:
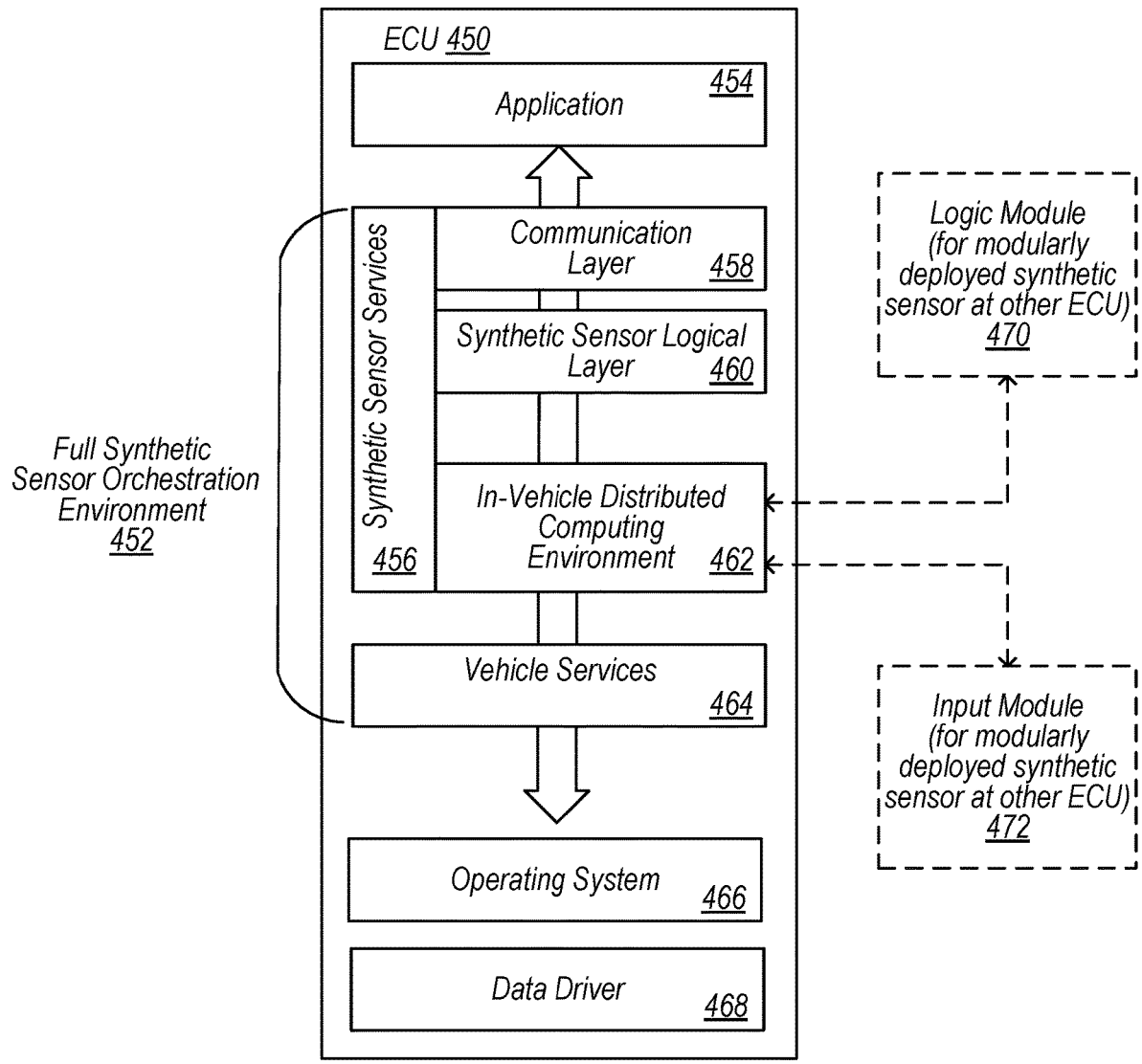
FIG. 4C is a block diagram illustrating a computing stack for an example electronic control unit (ECU) that implements a full synthetic sensor orchestration environment and that is connected to an in-vehicle distributed computing environment, according to some embodiments.

FIG. 4C is a block diagram illustrating a computing stack for an example electronic control unit (ECU) that implements a full synthetic sensor orchestration environment and that is connected to an in-vehicle distributed computing environment, according to some embodiments.

Full synthetic sensor orchestration environment 452 includes vehicle services 464 which may include the same or similar abstraction layers as vehicle services 414 described in FIG. 4B, wherein the abstraction layers abstract away details regarding operating system 466 and data drivers 468 of ECU 450. However, the full synthetic sensor orchestration environment 452 also includes synthetic sensor services 456, which include a connection to in-vehicle distributed computing environment 462. Note that in-vehicle communication environment 462, in-vehicle communication environment 414 may be a same in-vehicle communication environment 140 as shown in FIG. 1. For example, work 430 may be sent to synthetic sensor services 456 from ECU 408 via in-vehicle distributed computing environment 412, 464 (and vice versa). Additionally work form other input modules 472 may be sent to ECU 450 via in-vehicle distributed computing environment 462 and outgoing work may be sent from ECU 450 to logic modules 470 at other ECUs via in-vehicle distributed computing environment 462.

In some embodiments, synthetic sensor services 456 may additionally include a synthetic sensor logical layer 460 that performs logical work components of a synthetic sensor placed at ECU 450 or logical work components from input modules placed at other ECUs, wherein the logical work performed at ECU 450 using data from the input modules of the other ECUs and the input modules of the other ECUs execute in a runtime environment of in-vehicle distributed computing environment 462. Additionally, communication layer 458 may provide an interface to applications that interact with a given logical component of a synthetic sensor in the synthetic sensor logical layer 460.

Figure 5A:
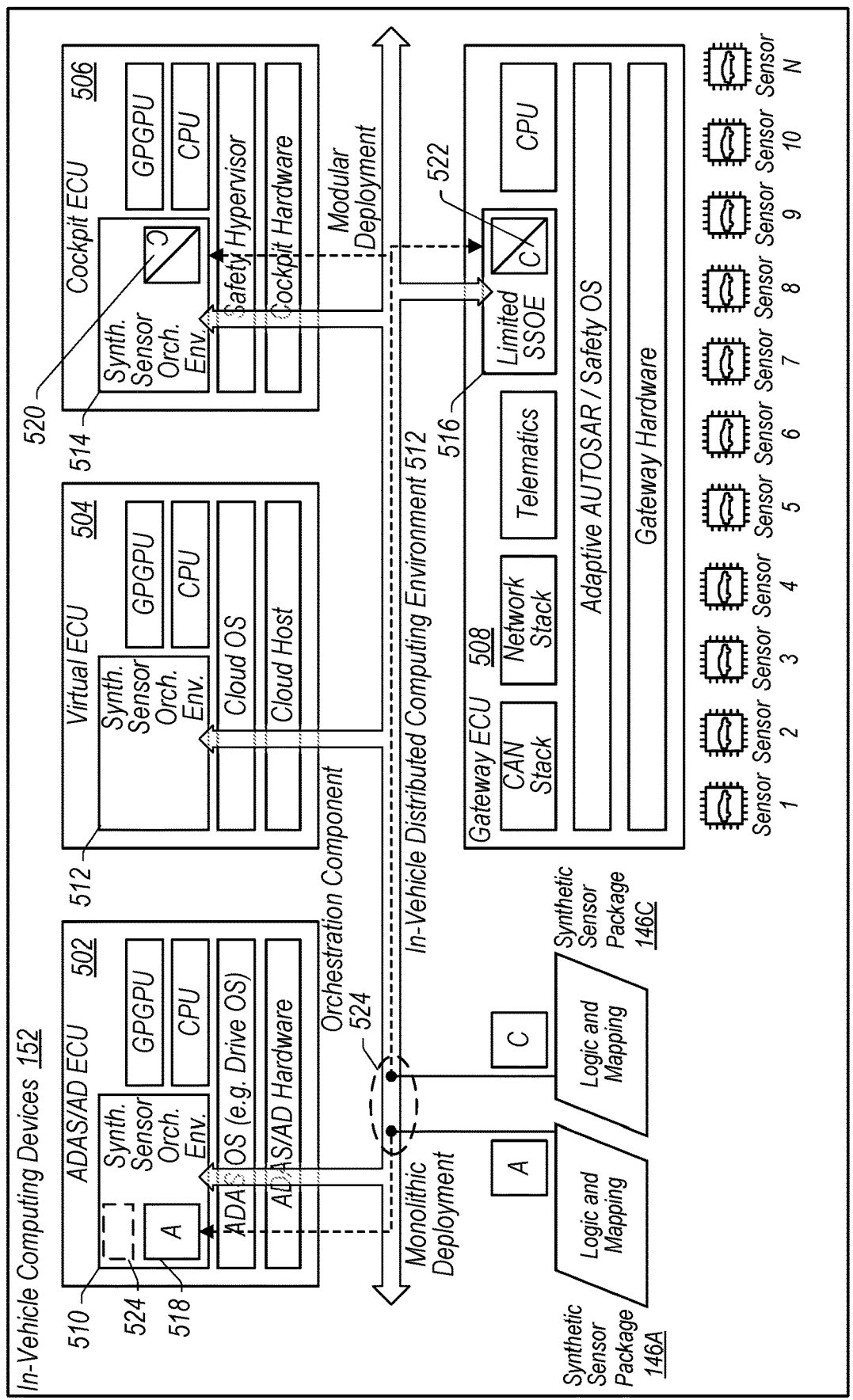
FIG. 5A is a block diagram illustrating electronic control units (ECUs) that are connected via an in-vehicle distributed computing environment, wherein an orchestration component of the in-vehicle distributed computing environment determines placement locations for synthetic sensors being deployed into the in-vehicle distributed computing environment, according to some embodiments.

FIG. 5A is a block diagram illustrating electronic control units (ECUs) that are connected via an in-vehicle distributed computing environment, wherein an orchestration component of the in-vehicle distributed computing environment determines placement locations for synthetic sensors being deployed into the in-vehicle distributed computing environment, according to some embodiments.

In some embodiments, synthetic sensor packages 146A and 146B are received into in-vehicle distributed computing environment 152 via orchestration component 524, which determines a placement decision for associated synthetic sensors. For example synthetic sensor "A" 518 is monolithically placed in synthetic sensor orchestration environment 518 of ECU 502. In contrast, synthetic sensor "C" may be modularly placed as a logical module 520 placed in synthetic sensor orchestration environment 514 of ECU 506 and input module 522 placed in limited synthetic sensor orchestration environment 516 of ECU 508. In some embodiments, orchestration component 524 determines placement based on annotations associated with the synthetic sensor packages 146A and/or 146B, input availabilities at the respective placement locations (e.g. ECUs 502, 504, 508, etc.), available resources at the placement locations (e.g. ECUs 502, 504, 508, etc.), such as CPU resources, general purpose GPU resources (GGPU), hardware, such as assisted driving system/automated driving hardware, cockpit hardware, network connectivity, bus availability, etc. For example, ADAS/AD ECU 502 may have more computational capacity than gateway ECU 508, but gateway ECU 508 may have more access to sensors such as sensors 1-N. For example, in some embodiments, sensors 1-N may include a camera, tire pressure sensors, back-up sensors, seat-belt sensors, windshield wiper sensors, etc. Also, other available inputs at gateway ECU 508 may include a satellite communication interface, V2X, LTE/5G, Wi-Fi, etc.

Figure 14:
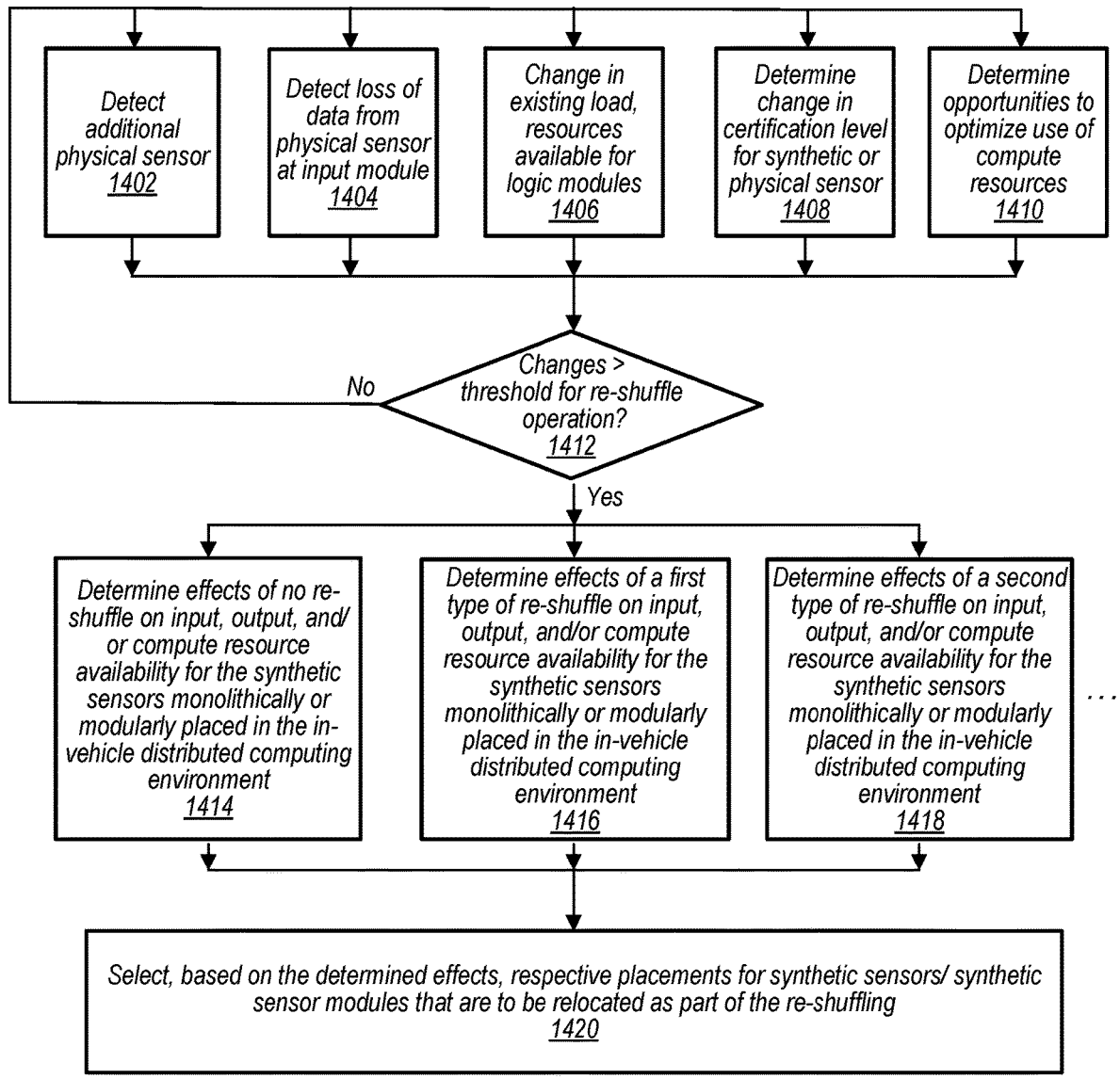
FIG. 14 illustrates a flowchart for re-shuffling physical sensors and/or modules of physical sensors in an in-vehicle distributed computing environment, according to some embodiments.

Also, as further discussed in FIG. 14, placements in in-vehicle distributed computing environment 512 may be re-shuffled in response to a dynamic re-evaluation of the situation (existing load, resource availability, etc.). Additionally, an administrator may indicate constraints on placements and a re-shuffling may move placements to satisfy the constraints indicated by the administrator.

Figure 5B:
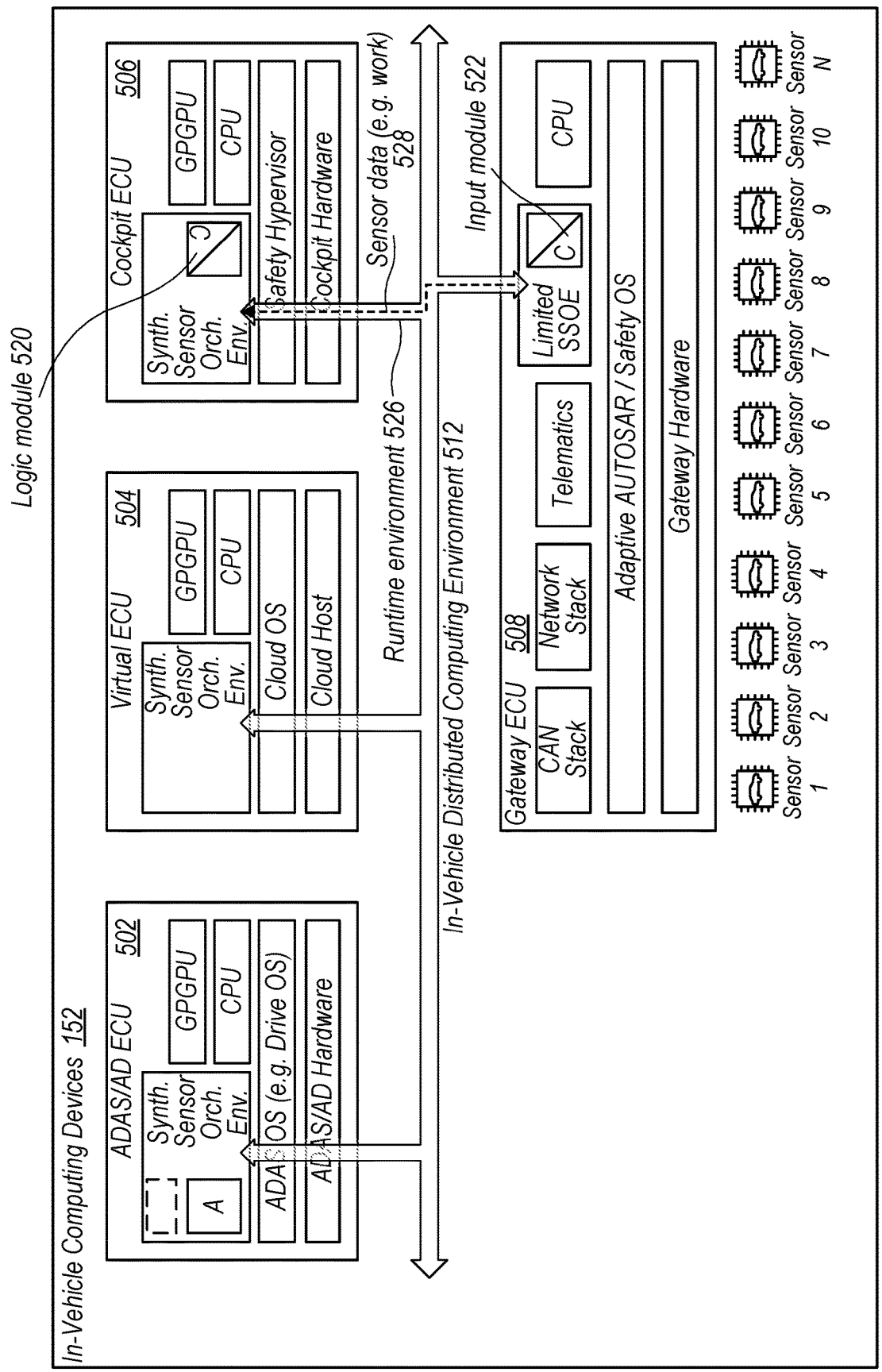
FIG. 5B is a block diagram illustrating a first synthetic sensor placed as a monolithic synthetic sensor at a first placement location in the in-vehicle distributed computing environment, and a second synthetic sensor placed as two modular components located at two different placement locations in the in-vehicle distributed computing environment, according to some embodiments.

FIG. 5B is a block diagram illustrating a first synthetic sensor placed as a monolithic synthetic sensor at a first placement location in the in-vehicle distributed computing environment, and a second synthetic sensor placed as two modular components located at two different placement locations in the in-vehicle distributed computing environment, according to some embodiments.

As an example of a modular deployment, once synthetic sensor "C" is placed, input module 522 and logic module 520 may execute in runtime environment 526 to share work 528.

Figure 5C:
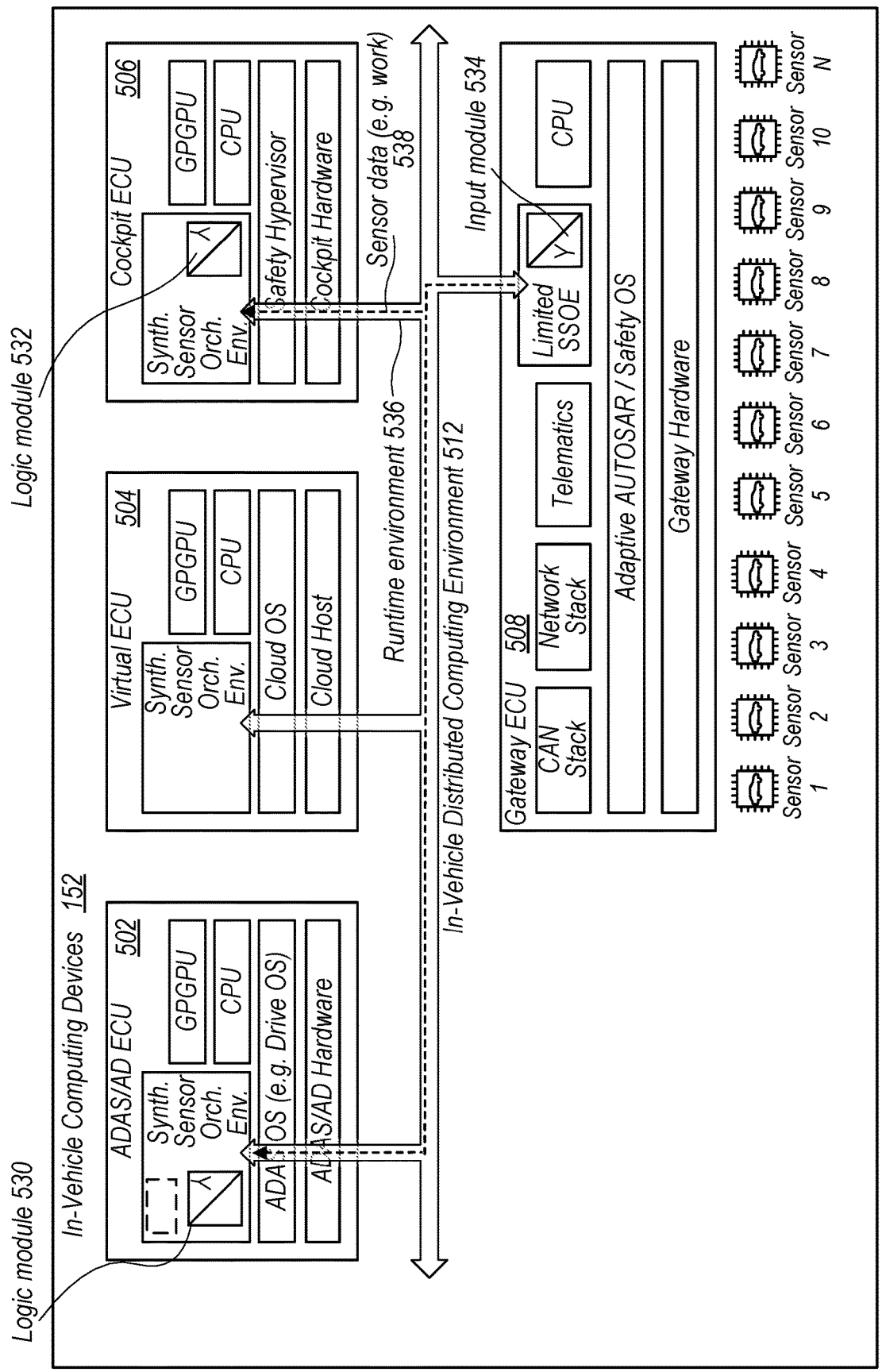
FIG. 5C is a block diagram illustrating a synthetic sensor placed using two logic modules and an input module, wherein the two logic modules and the input module execute in a runtime environment of the in-vehicle distributed computing environment, according to some embodiments.

FIG. 5C is a block diagram illustrating a synthetic sensor placed using two logic modules and an input module, wherein the two logic modules and the input module execute in a runtime environment of the in-vehicle distributed computing environment, according to some embodiments.

In some embodiments, logic portions of a synthetic sensor may be distributed across multiple logic modules. For example, in FIG. 5C logic module 530 of synthetic sensor "Y" is placed in ECU 502, logic module 532 of synthetic sensor "Y" is placed in ECU 506 and input module 534 of synthetic sensor "Y" is placed in ECU 508.

In some embodiments, wherein the logic modules are processing significant amounts of data, multiple instances of the same logic may be implemented on multiple logic modules, wherein each of the respective logic modules processes a portion of the data. The results of the processing may then be aggregated by yet another logic module, as an example. Also, as another example, a first logic module may serve as a primary logic module and may delegate tasks to a secondary logic module that also runs in the runtime environment with the first logic module.

Figure 5D:
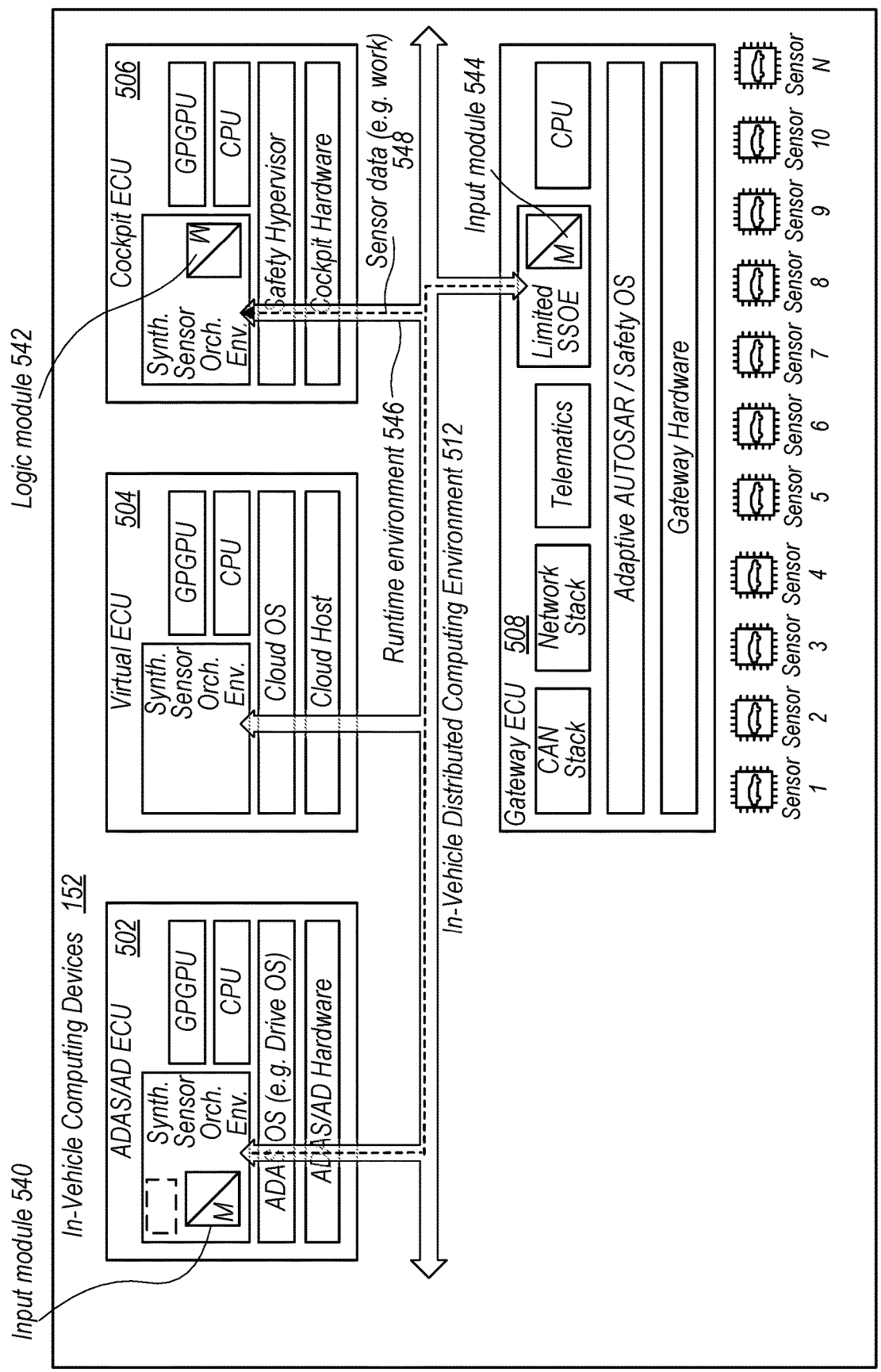
FIG. 5D is a block diagram illustrating a synthetic sensor placed using two input modules and a logic module, wherein the two input modules and the logic module execute in a runtime environment of the in-vehicle distributed computing environment, according to some embodiments.

FIG. 5D is a block diagram illustrating a synthetic sensor placed using two input modules and a logic module, wherein the two input modules and the logic module execute in a runtime environment of the in-vehicle distributed computing environment, according to some embodiments.

As yet another example, in some embodiments, a synthetic sensor may be modularly placed with multiple input modules. For example, synthetic sensor "M" is placed with input module 540 placed at ECU 502, input module 544 placed at ECU 508, and logic module 542 placed at ECU 506.

Figure 5E:
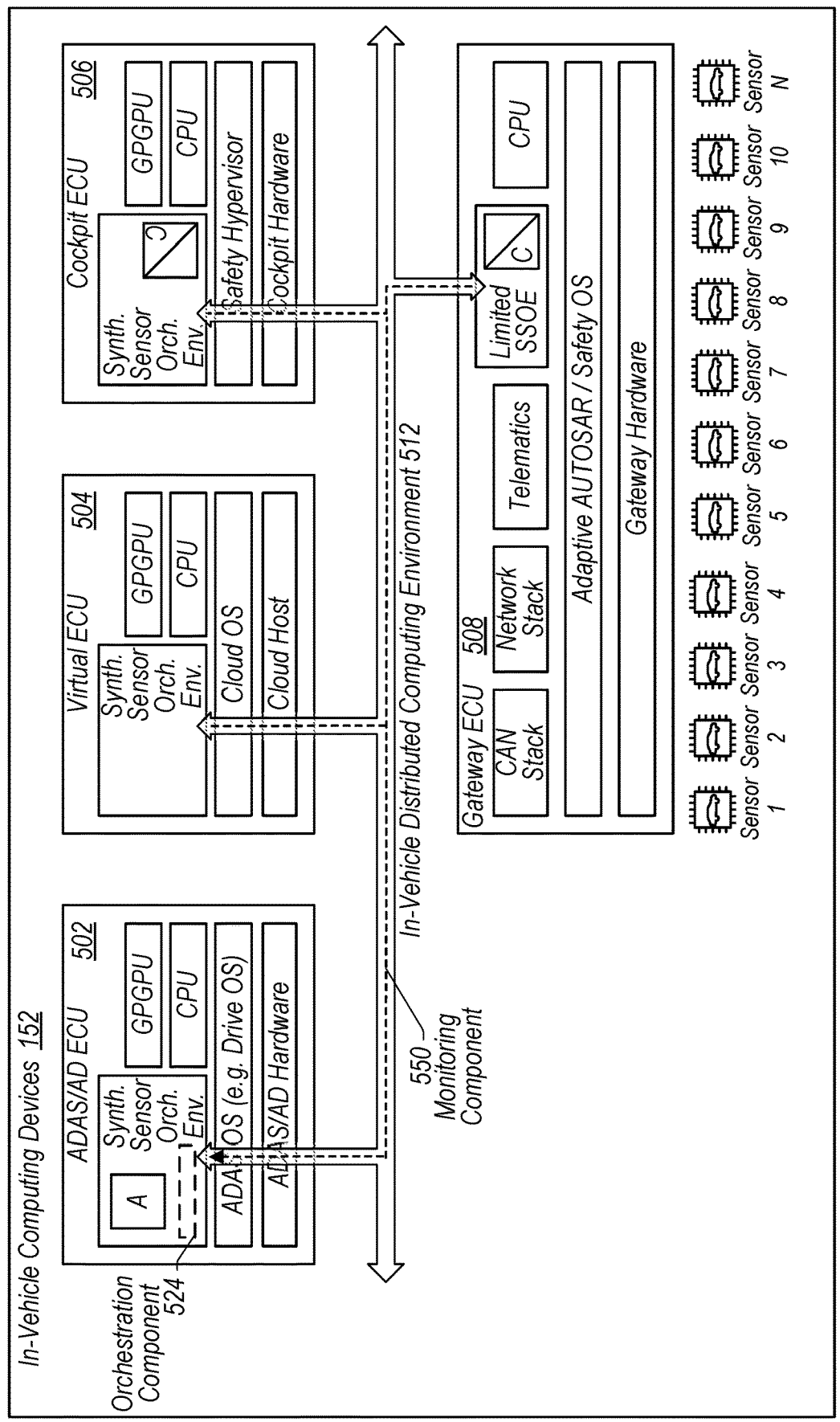
FIG. 5E is a block diagram illustrating a monitoring component of the in-vehicle distributed computing environment that reports ECU capabilities and current state to an orchestration component of the in-vehicle distributed computing environment, according to some embodiments.

FIG. 5E is a block diagram illustrating a monitoring component of the in-vehicle distributed computing environment that reports ECU capabilities and current state to an orchestration component of the in-vehicle distributed computing environment, according to some embodiments.

As shown in FIG. 5E, a monitoring component 550 of in-vehicle distributed computing environment 512 may collect and provide health information to orchestration component 524.

FIG. 6 illustrates a synthetic sensor service that is configured to deploy a common synthetic sensor package to varying types of vehicles that each implement an in-vehicle synthetic sensor orchestration environment, according to some embodiments.

In some embodiments, input interfaces to synthetic sensor orchestration environments may be standardized such that the synthetic sensor orchestration environments are able to receive a common synthetic sensor package from a synthetic sensor service, while also interfacing with different communication interfaces of electronic sensors included in different types of vehicles. For example synthetic sensor service 102 may deploy a common synthetic sensor package 608 to each of multiple different types of vehicles such as car 602, a truck 604, and a van 606 that may be manufactured by different vehicle manufacturers and may include electrical sensors manufactured by different parts manufacturers.

Figure 7:
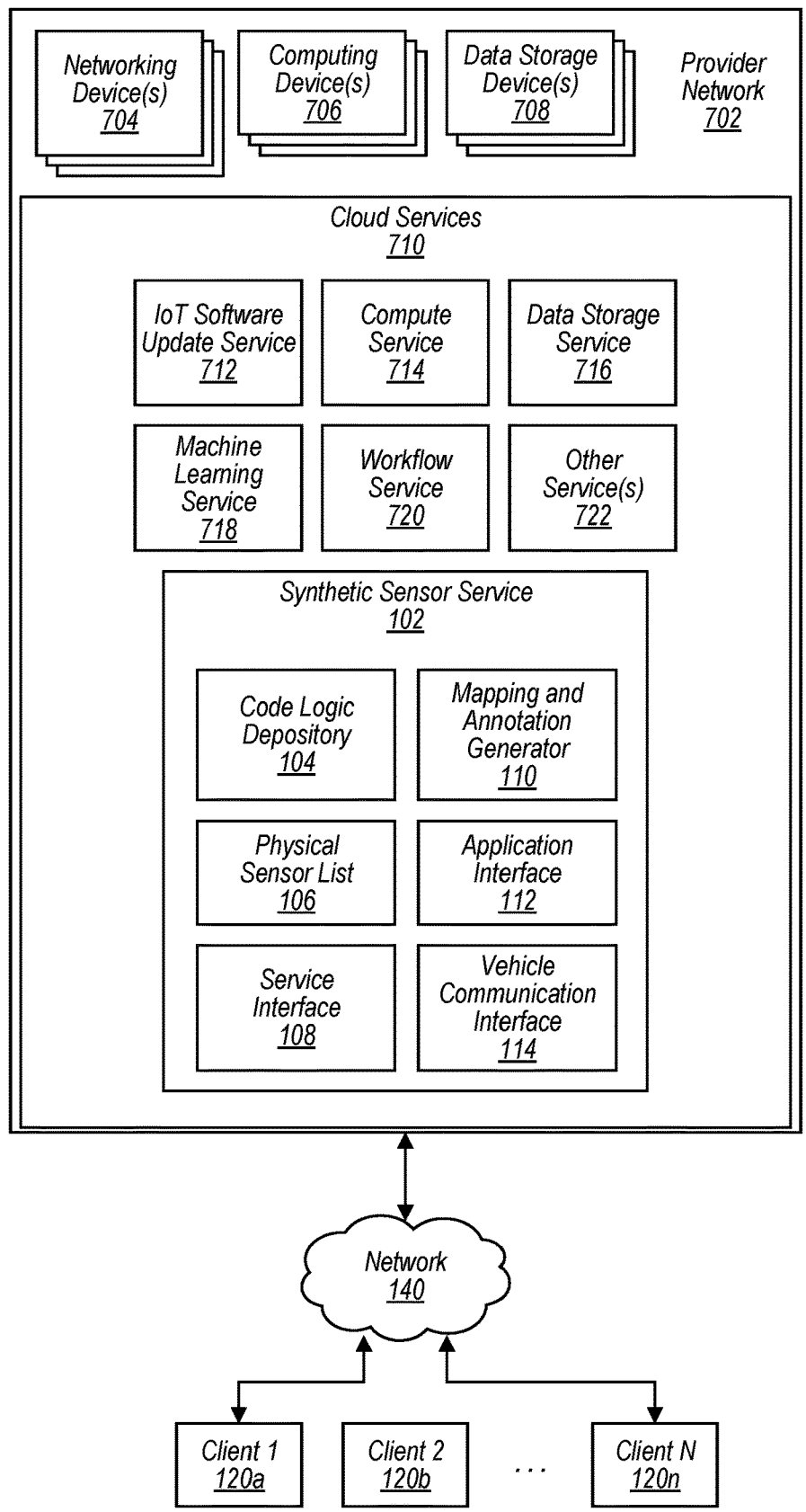
FIG. 7 illustrates an example provider network that includes a synthetic sensor service as well as other cloud services offered by the provider network, according to some embodiments.

FIG. 7 illustrates an example provider network that includes a synthetic sensor service as well as other cloud services offered by the provider network, according to some embodiments.

In some embodiments, a provider network, such as provider network 702, includes networking devices 704, computing devices 706, and data storage devices 708 that implement cloud services 710. In some embodiments, a provider network may implement a plurality of cloud services in addition to a synthetic sensor service. For example, provider network 702 implements cloud services 710 that include IoT software update service 712, compute service 714, data storage service 716, machine learning service 718, workflow service 720, and other services 722. Cloud services 710 also includes synthetic sensor service 102.

In some embodiments, an IoT software update service, such as IoT software update service 712, may facilitate software updates on devices connected to the IoT software update service, such as vehicles 124, 148, and 150 as illustrated in FIG. 1 or vehicles 602, 604, and 606 as illustrated in FIG. 6. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 714, may include computing devices that implement virtual compute machines that may be used to analyze collected vehicle usage information and/or may be used to implement a synthetic sensor service.

In some embodiments, a data storage service, such as data storage service 716, may include data storage devices that implement a virtualized data storage, such as virtual data storage volume or virtual storage containers for an object-based storage. In some embodiments, a data storage service, such as data storage service 716, may be used to store collected vehicle usage information for a client. Also, in some embodiments, a data storage service, such as data storage service 716, may be used to implement components of a synthetic sensor service. For example, in some embodiments, code logic depository 104 and physical synthetic sensor list 106 may be implemented using virtual storage resources of data storage service 716.

In some embodiments, a machine learning service may execute one or more machine learning algorithms to determine relationships to be used in a synthetic sensor, to optimize a workflow service, or to optimize another service. For example, in some embodiments, a machine learning service, such as machine learning service 718, may be used to optimize software for a synthetic sensor and may utilize collected vehicle usage information from a synthetic sensor orchestration environment, such as synthetic sensor orchestration environment 140, to perform such machine learning or to produce machine learning inference outputs.

In some embodiments, a workflow service, such as workflow service 720, may execute a workflow based on input data and a stored or developed workflow. For example, in some embodiments, a workflow service, such as workflow service 720, may determine actions to be taken based on collected vehicle usage information. As an example, a workflow service may determine a filter, hose, or fluid needs to be changed or replaced based on applying collected vehicle usage information to one or more stored or developed work flows. In some embodiments, a machine learning service, such as machine learning service 718, may be used to develop or improve work flows executed by workflow service 720.

In some embodiments, cloud services 710 may include various other cloud services, such as other services 722.

FIG. 8 illustrates an example client console of a synthetic sensor service, according to some embodiments.

In FIG. 8 a "sensor access" tab has been selected that indicates existing physical sensors in an "OEM A" vehicle having the model years 2009, 2010, or 2011, with a particular operating system platform and trim levels. Also, as shown in FIG. 8, some sensor data from some sensors may be available to first party applications (e.g. OEM manufacturer applications), while sensor data from other sensors may be available to second party applications (e.g. OEM parts manufacturer applications), and sensor data from another set of sensors may be available in an automotive open system architecture (e.g. Auto SAR), a third party, such as an application developer that is not a first party OEM or a second party OEM parts manufacturer. For example, third party applications may be from an OEM's ecosystem of developers, or could be applications from an existing application store ecosystem of developers. Also, while not shown in FIG. 8, the system access tab may be selected to see which systems (e.g. safety system domain, entertainment domain, in-vehicle controls domain, etc.) can be accessed by the first party, second party, third party and/or Auto SAR applications. Additionally, the "compute unit control" tab may be selected to determine whether the first party, second party, third party and/or Auto SAR applications may interact with a computer controller in the respective domains. An interface such as shown in FIG. 8 may be used to select input sensors to drag and drop into a synthetic sensor definition as shown in FIG. 2.

Also, in some embodiments, the user interface shown in FIG. 8 may allow a customer to specify one or more processor requirements, for example for a monolithically placed synthetic sensor, or for a logic module of a modularly placed synthetic sensor. For example the customer may specify a placement at an ECU or (virtual ECU) with a particular type of processor, such as GPU, general purpose GPU, multi-core CPU, etc.

Also, in some embodiments, the user interface shown in FIG. 8 may allow a customer to specify other synthetic sensor placement requirements, such as enabling automated re-shuffling (as further described in FIG. 14), enabling or restricting module deployment, or other customer specified placement rules.

Figure 9:
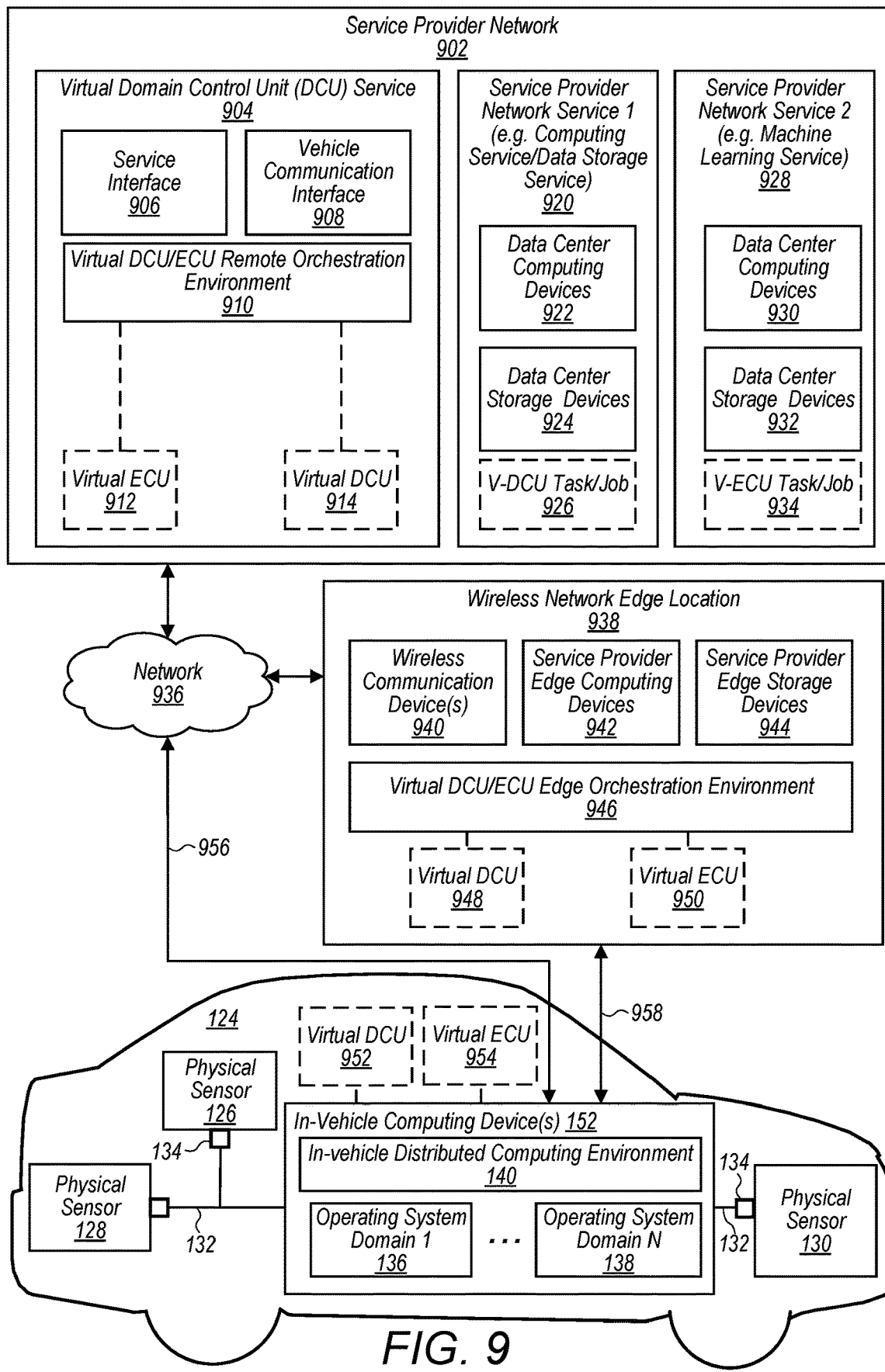
FIG. 9 illustrates virtual domain control units (virtual DCUs) and virtual electronic control units (virtual ECUs) that execute code associated with a vehicle, according to some embodiments.
Figure 10:
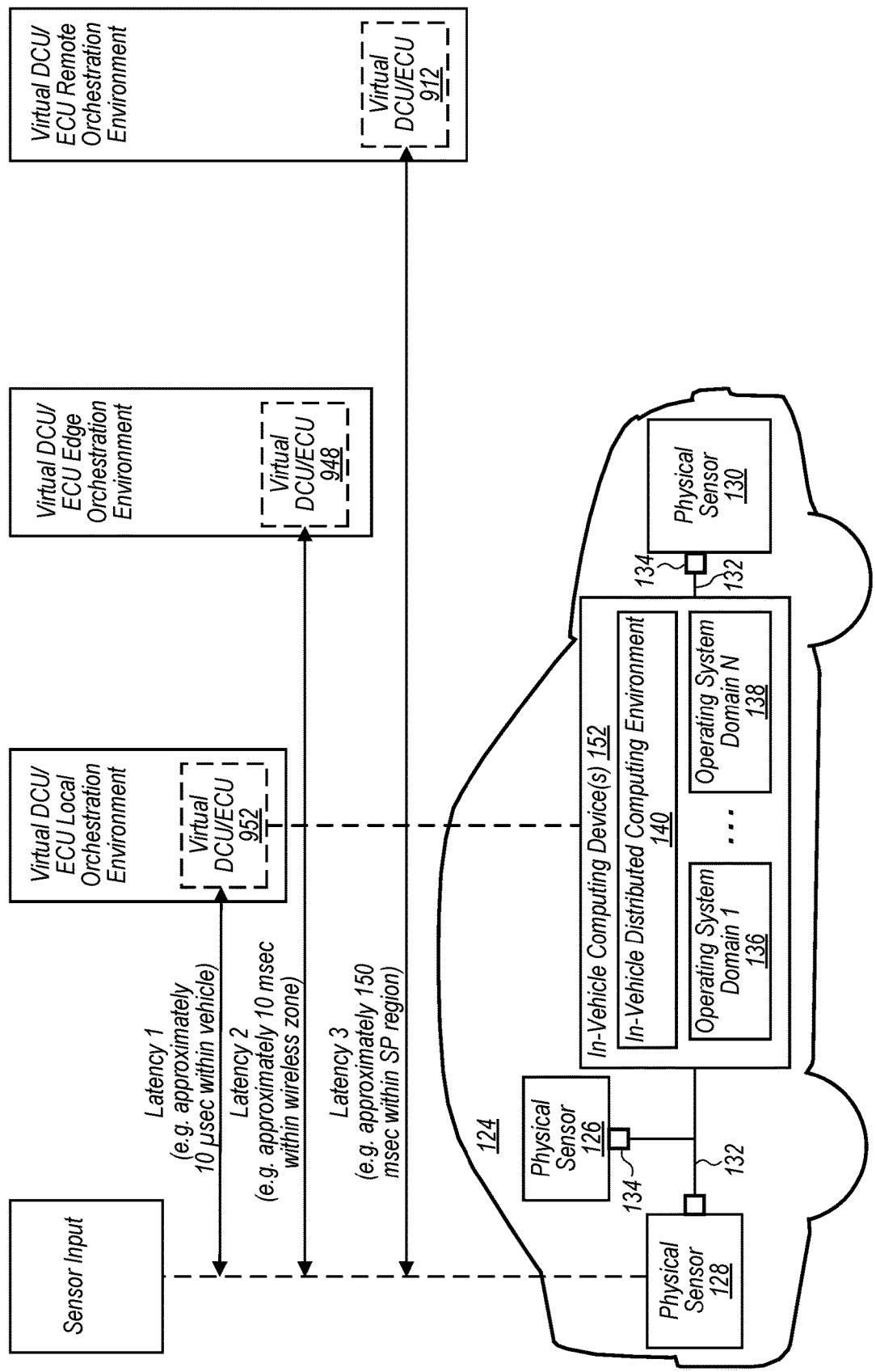
FIG. 10 illustrates example one-way trip latencies between a physical component of the vehicle, such as a sensor, and virtual DCUs/ECUs implemented at different locations relative to the vehicle, according to some embodiments.

FIG. 9 illustrates virtual domain control units (virtual DCUs) and virtual electronic control units (virtual ECUs) that execute code associated with a vehicle in a local virtual DCU/ECU orchestration environment at the vehicle and also execute code associated with the vehicle in remote virtual DCU/ECU orchestration environments remote from the vehicle, according to some embodiments.

Service provider network 902 implements virtual domain control unit (DCU) service 904, and service provider network services such as service provider network service 920 and service provider network service 928. In some embodiments, service provider network 902 may comprise one or more data centers in one or more regions of the service provider network that each comprise computing, data storage, networking and/or other devices that implement the service provider network 902. For example, service provider network service 920 includes/is implemented using data center computing devices 922 and data center storage devices 924. In a similar manner, service provider network service 928 includes/is implemented using data center computing devices 930 and data center storage devices 932. In some embodiments, data center computing devices and data center storage devices may include rack-mounted computing devices such as servers mounted in a data hall of a data center.

Virtual domain control unit service 904 may be implemented using resources of other services of service provider network 902, such as using computing resources of a computing service of the service provider network and using data storage resources of a storage service of the service provider network 902, such as services of service provider network service 920 or 928.

In some embodiments, virtual domain control unit service 904 includes service interface 906, vehicle communication interface 908, and remote virtual DCU/ECU orchestration environment 910. Note that in some embodiments, virtual domain control service 904 may be used to deploy code packages to virtual DCUs, virtual ECUs, or both. Also, in some embodiments, virtual domain control unit service 904 may be used by a customer of the virtual DCU service 904 to reserve, allocate, de-allocate and manage virtual DCUs, virtual ECUs, or both.

In some embodiments, the service interface of a virtual DCU/ECU service, such as service interface 906, may implement a service console, an application programmatic interface configured to receive vehicle code package/virtual DCU package/virtual ECU package instructions from clients through a command line interface, a graphical user interface, or other suitable interface that enables clients to select and/or design new vehicle code packages/virtual DCU packages/virtual ECU packages to be deployed to vehicles that include virtual DCU/ECU orchestration environments. Note in some embodiments, a vehicle, such as vehicle 124, may be manufactured to include virtual DCU/ECU connectivity in in-vehicle distributed computing environment 140 at the time of manufacture, wherein the virtual DCU/ECU connectivity enables new vehicle code packages/virtual DCU packages/virtual ECU packages to be deployed to vehicle 124 subsequent to manufacture and subsequent to being put into use by an owner or operator of the vehicle 124.

In some embodiments, vehicle code packages (such as logic modules of a modularly placed synthetic sensor) may be placed at remote virtual DCU/ECUs that are configured to communicate with vehicle. For example, a vehicle code package may be placed at virtual ECU 912 or virtual DCU 914 included in a service provider network region and implemented in virtual DCU/ECU remote orchestration environment 910. As another example, a vehicle code package may be placed at virtual DCU 948 or virtual ECU 950 included in wireless network edge location 938 that also includes wireless communication devices 940 that establish a wireless connection 958 with vehicle 124. Note that wireless connection 958 is directly between wireless edge location 938 and vehicle 124, whereas a connection 956 to a data center hosting computing devices that implement virtual DCU/ECU remote orchestration environment 910 may include intermediate networking devices/hops via network 936. For example, in some embodiments, service provider edge computing devices 942 and service provider edge storage devices 944 may be co-located at a wireless edge location that includes wireless communication devices 940. As a further example, wireless communication devices 940 may be wireless antenna that implement a 5G wireless network and service provider edge computing devices 942 and service provider edge storage devices 944 may be physically located in a same or adjacent facility as the wireless antenna. Also, the service provider edge computing devices 942 and service provider edge storage devices 944 may implement the virtual DCU/ECU edge orchestration environment 946.

In some embodiments, outputs from one or more first virtual DCUs or virtual ECUs may be inputs to other virtual DCUs or virtual ECUs in a same or different location. In this way a network of virtual DCUs/ECUs may be formed such that tasks that require low latencies are executed locally at a virtual DCU/ECU at the vehicle or at a wireless network edge location, while other tasks that are not as sensitive to latencies may be executed using a virtual DCU/ECU at a remote region data center, such as virtual ECU 912 and/or virtual DCU 914. Also, in some embodiments a virtual DCU/ECU may outsource tasks or jobs to other services of service provider network 902. For example V-DCU task/job 926 has been outsourced by virtual DCU 914 to service provider network service 920. Also, V-ECU task/job 934 has been delegated to service provider network service 928. For example, in some embodiments, virtual DCU 948 or virtual ECU 950 at the wireless network edge location may have delegated V-ECU task/job 934 to service provider network service 928.

In some embodiments, a remote execution environment for a vehicle code package may implement/use a standardized coding paradigm, such that developers of vehicle code packages to be executed via virtual DCUs/ECUs may use a common coding paradigm to develop vehicle code packages to be deployed to vehicles manufactured by different manufacturers and/or to be placed at different virtual DCU/ECU orchestration environments located in different locations (e.g. local, edge, remote, etc.).

FIG. 2 illustrates example one-way trip latencies between a physical component of the vehicle, such as a sensor, and virtual DCUs/ECUs implemented at different locations relative to the vehicle, according to some embodiments.

As discussed above, in some embodiments, a placement for a vehicle code package/virtual DCU package/virtual ECU package may be selected based on latency requirements of the vehicle code. For example, some types of code may require low latencies between vehicle components. For example, an application implemented using vehicle code that detects an obstacle in the road may require low latencies between a sensor and an output device. However, as another example, an application that adjusts a seat position for a passenger when the passenger enters the vehicle may be able to tolerate a higher latency. As yet another example, an application that, for example, provides song recommendations, may not be sensitive to latency to similar degree as other applications. In these different examples, a vehicle code package for the applications may indicate latency requirements and the vehicle code packages comprising code to implement these applications may be placed on virtual DCUs/ECUs at different locations that provide different levels of latency and or/different capacities, such as different computing capacity, different storage, capacity, different access to other provider network services, etc.

As shown in FIG. 2, in some embodiments a one way latency from a sensor to a virtual DCU/ECU at an edge wireless network location may be in the range of 10 milliseconds.

In some embodiments, a remote virtual DCU/ECU orchestration environment may have a one-way latency in the range of 150 milliseconds, which may be satisfactory for song recommendations, as an example of an application with higher storage or compute requirements but less sensitivity to latency.

Figure 11:
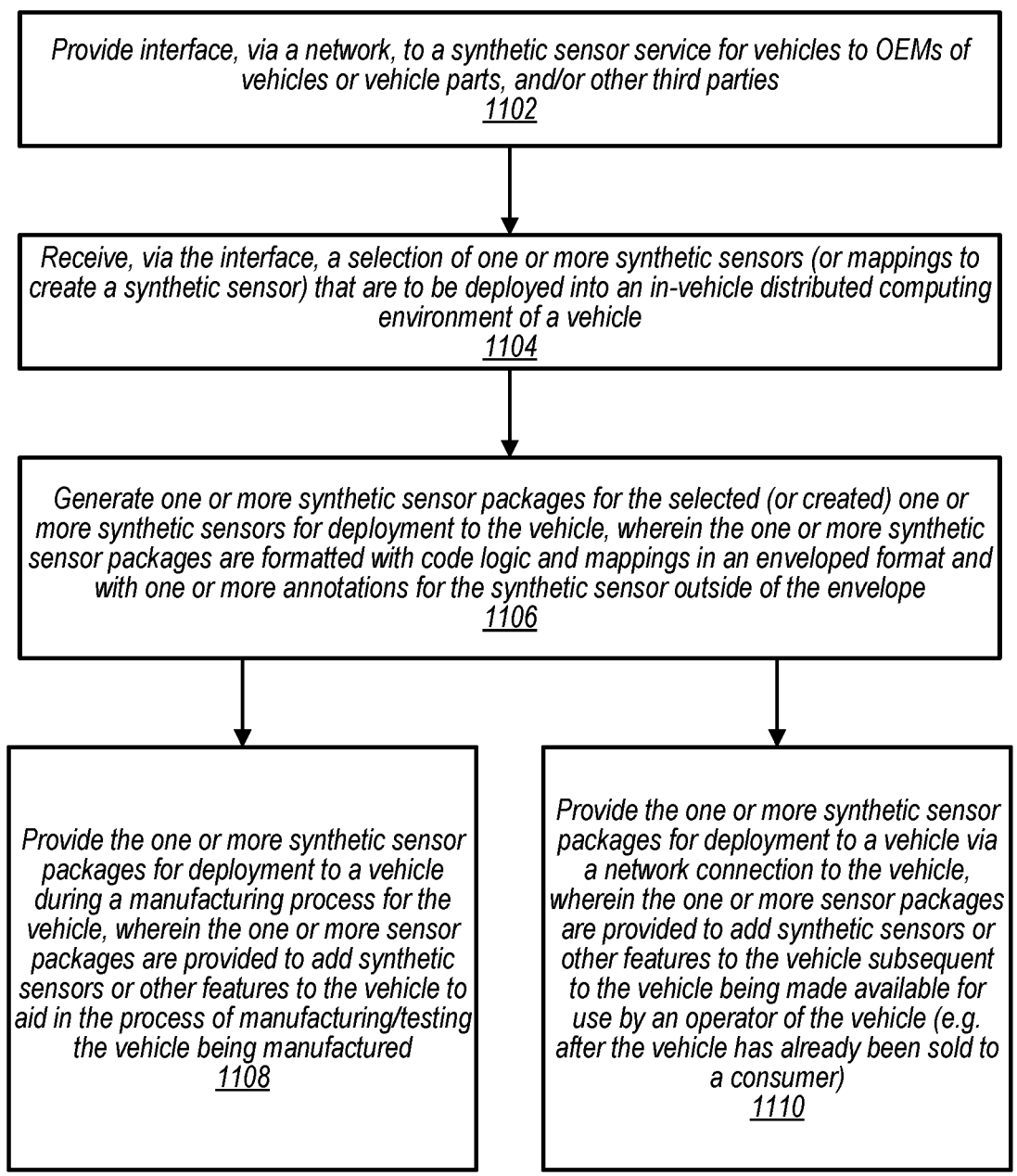
FIG. 11 illustrates a flowchart for operations of a synthetic sensor service, according to some embodiments.

FIG. 11 illustrates a flowchart for operations of a synthetic sensor service, according to some embodiments.

At 1102, a synthetic sensor service provides an interface to vehicle manufacturers, parts manufacturers, or other third parties. The interface may enable the clients of the synthetic sensor service to design new types of synthetic sensors. The interface may also be used to cause particular types of synthetic sensors, such as those designed by the clients, to be deployed to particular vehicles. In some embodiments, the interface may provide an API for an application store to automatically cause synthetic sensor packages to be deployed to particular vehicles in response to an application being purchased for the particular vehicle that uses the synthetic sensor.

At 1104, the synthetic sensor service receives, via the interface, a selection of one or more synthetic sensors (or mappings to create a synthetic sensor) that are to be deployed into a synthetic sensory orchestration environment of a vehicle.

At 1106, the synthetic sensor service generates one or more synthetic sensor packages for the selected (or created) one or more synthetic sensors for deployment to the synthetic sensor orchestration environment of the vehicle, wherein the one or more synthetic sensor packages are formatted with code logic and mappings in an enveloped format and with one or more annotations for the synthetic sensor outside of the envelope.

At 1108, the synthetic sensor service provides the one or more synthetic sensor packages for deployment to a vehicle for deployment during a manufacturing process of the vehicle. In some embodiments, the one or more synthetic sensors associated with the one or more synthetic sensor packages may aid in the process of manufacturing and/or testing the vehicle being manufactured. In some embodiments, the one or more synthetic sensor packages may be deployed during the manufacturing process after the vehicle has power (e.g. has a battery installed), has an in-vehicle computer installed in the vehicle, and has a wiring harness attached to the in-vehicle computer. In some embodiments, the one or more sensors associated with the one or more synthetic sensor packages may run quality assurances models to check the quality of installed physical sensors and computing systems. In some embodiments, the synthetic sensors may be released from the synthetic sensor orchestration environment upon the vehicle passing the quality assurance testing.

At 1110, the synthetic sensor service provides the one or more synthetic sensor packages for deployment to a vehicle via a network connection to the vehicle, wherein the one or more sensor packages are provided to add synthetic sensors or other features to the vehicle subsequent to the vehicle being made available for use by an operator of the vehicle (e.g. after the vehicle has already been sold to a consumer).

In some embodiments, a synthetic sensor service may perform both 1108 and 1110 for a vehicle, or may only perform one, but not the other.

Figure 12:
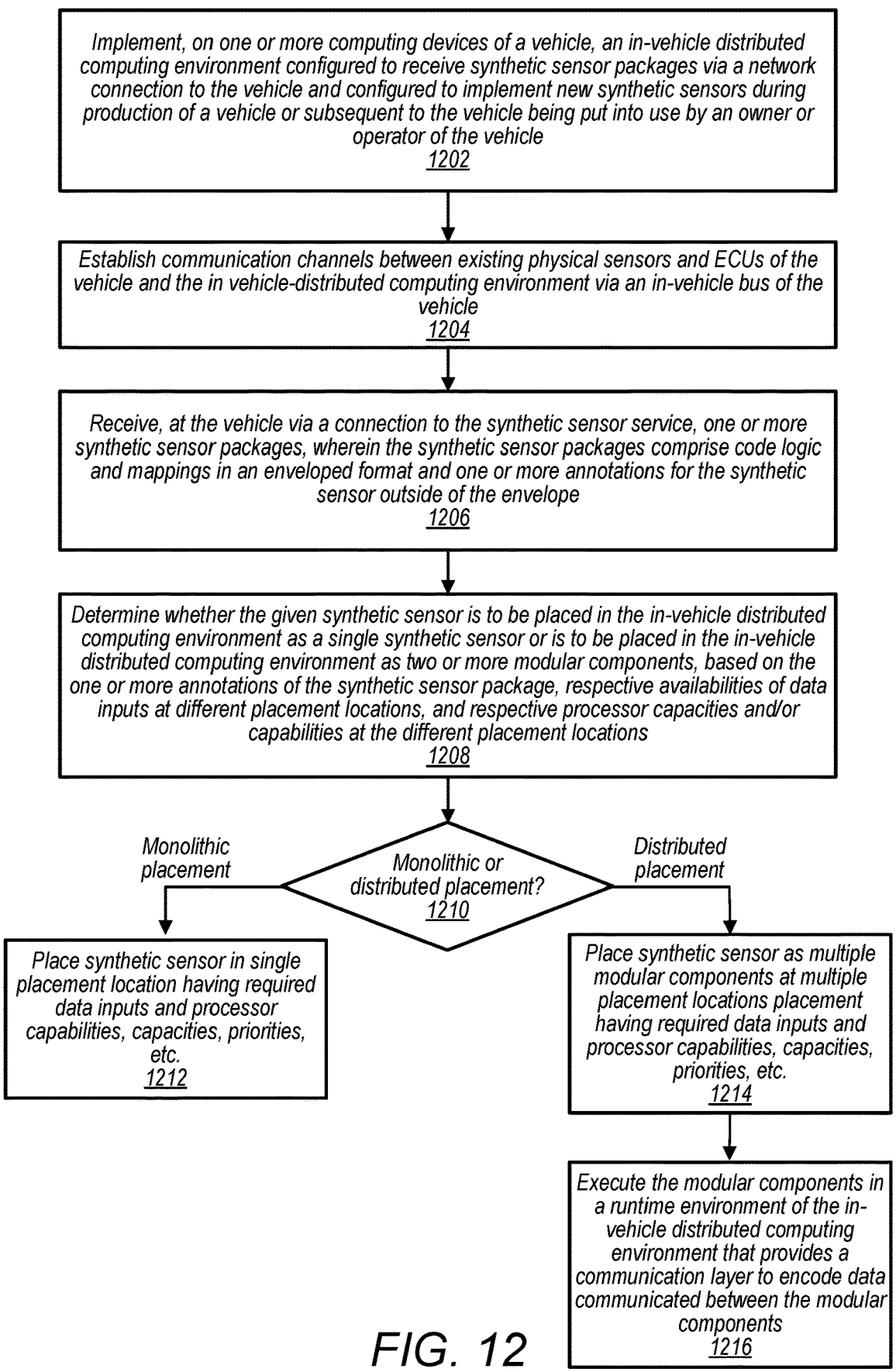
FIG. 12 illustrates a flowchart for operations of an in-vehicle distributed computing environment, according to some embodiments.

FIG. 12 illustrates a flowchart for operations of an in-vehicle distributed computing environment, according to some embodiments.

At 1202, an in-vehicle computer device of a vehicle implements an in-vehicle distributed computing environment configured to receive synthetic sensor packages via a network connection to the vehicle and configured to implement new synthetic sensors during production of a vehicle or subsequent to the vehicle being put into use by an owner or operator of the vehicle.

At 1204, the in-vehicle distributed computing environment establishes communication channels between existing physical sensors and/or ECUs of the vehicle and the in-vehicle distributed computing environment via an in-vehicle bus of the vehicle.

At 1206, the in-vehicle distributed computing environment receives, at the vehicle via the network connection to the synthetic sensor service or via a local production network in a manufacturing site, one or more synthetic sensor packages, wherein the synthetic sensor packages comprise code logic and mappings in an enveloped format and one or more annotations for the synthetic sensor outside of the envelope.

At 1208/1210, the in-vehicle distributed computing environment determines whether the given synthetic sensor is to be placed in the in-vehicle distributed computing environment as a single synthetic sensor or is to be placed in the in-vehicle distributed computing environment as two or more modular components, based on the one or more annotations of the synthetic senor package, respective availabilities of data inputs at different placement locations, and respective processor capacities and/or capabilities at the different placement locations.

At 1212, if a monolith placement is determined, the in-vehicle distributed computing environment places the synthetic sensor in single placement location having required data inputs and processor capabilities, capacities, priorities, etc.

At 1214, if a modular placement is determined, the in-vehicle distributed computing environment places the synthetic sensor as multiple modular components at multiple placement locations placement having required data inputs and processor capabilities, capacities, priorities, etc.

At 1216, the in-vehicle distributed computing environment executes the modular components in a runtime environment of the in-vehicle distributed computing environment that provides a communication layer to encode data communicated between the modular components.

Figure 13:
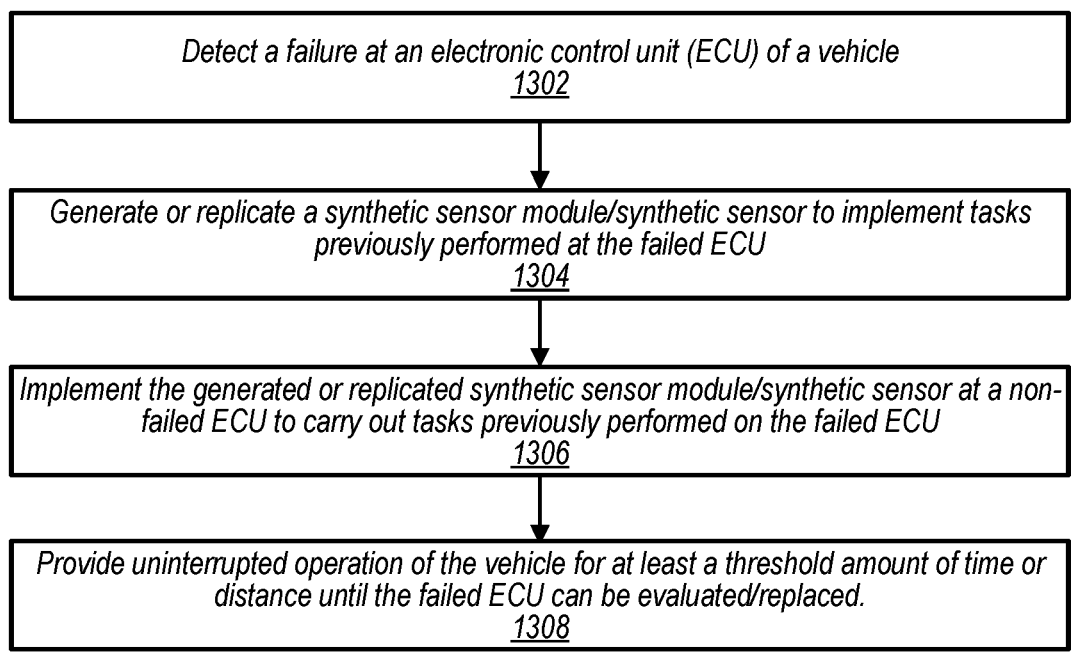
FIG. 13 illustrates a flowchart for a response to a failed ECU carried out in an in-vehicle distributed computing environment, according to some embodiments.

FIG. 13 illustrates a flowchart for a response to a failed ECU carried out in an in-vehicle distributed computing environment, according to some embodiments.

At 1302, the in-vehicle distributed computing environment detects a failure at an electronic control unit (ECU) of a vehicle.

At 1304, the in-vehicle distributed computing environment generates or replicates a synthetic sensor module/synthetic sensor to implement tasks previously performed at the failed ECU.

At 1306, the in-vehicle distributed computing environment implements the generated or replicated synthetic sensor module/synthetic sensor at a non-failed ECU to carry out tasks previously performed on the failed ECU.

At 1308, the in-vehicle distributed computing environment provides uninterrupted operation of the vehicle for at least a threshold amount of time or distance until the failed ECU can be evaluated/replaced.

FIG. 14 illustrates a flowchart for re-shuffling physical sensors and/or modules of physical sensors in an in-vehicle distributed computing environment, according to some embodiments.

At 1402, the orchestration component of the in-vehicle distributed computing framework detects whether an additional physical sensor has been added to the vehicle at one or more placement locations (e.g. ECUs), or if additional placement locations have been added to the vehicle (e.g. additional ECUs).

At 1404, the orchestration component of the in-vehicle distributed computing framework detects whether communications from an existing physical sensor have been lost at one or more placement locations (e.g. ECUs).

At 1406, the orchestration component of the in-vehicle distributed computing framework detects changes in loads, resources available for logic modules, etc. at one or more placement locations (e.g. ECUs).

At 1408, the orchestration component of the in-vehicle distributed computing framework determines whether or not one or more changes in certification level have taken place for a synthetic sensor implemented in the synthetic sensor orchestration environment or in relation to a physical sensor that shares sensor data with the synthetic sensor orchestration environment.

At 1410, the orchestration component of the in-vehicle distributed computing framework determines opportunities to optimize use of compute resources of the vehicle. For example, if a reliable network connection is available logic modules may be shuffled to a virtual ECU to conserve lifespan of the ECUs mounted in the vehicle. As an example, when the vehicle is charging in a location with reliable network connectivity, certain operations, such as control of the battery or inverter that must stay active during the charging process may be re-located to a virtual ECU. This may significantly reduce active operating hours of the ECUs in the vehicle by transitioning an overnight charge time to a virtual ECU.

At 1412, the orchestration component of the in-vehicle distributed computing framework determines whether a number or importance of the changes taken place at 1402, 1404, 1406, 1408, or 1410 exceed one or more threshold to cause a re-shuffle operation to be performed. In a re-shuffle operation, the orchestration component of the in-vehicle distributed computing framework may re-evaluate placements of already implemented synthetic sensors or synthetic sensor modules (e.g. input modules or logic modules) to determine if placing one or more of the already implemented synthetic sensors/modules in a different placement location would improve system performance, increase certifications levels of the synthetic sensors, or otherwise provide better performance. If the one or more threshold have not been exceeded at 1412, the orchestration component of the in-vehicle distributed computing framework continues to monitor for additional changes.

If the one or more thresholds are exceeded at 1412, at 1414 through 1418, the orchestration component of the in-vehicle distributed computing framework determines effects of relocating one or more already implemented synthetic sensors/modules to different placement locations. For example, re-locating synthetic sensors may provide optional inputs to a re-located synthetic sensor or to a synthetic sensor in a domain into which a synthetic sensor is already implemented. Such additional optional inputs may allow at least some of the synthetic sensors to be upgraded to a higher certification level.

At 1420, the orchestration component of the in-vehicle distributed computing framework selects based on the determined effects respective placements for synthetic sensors/modules that are to be relocated as part of the re-shuffling.

Example Computer System

Figure 15:
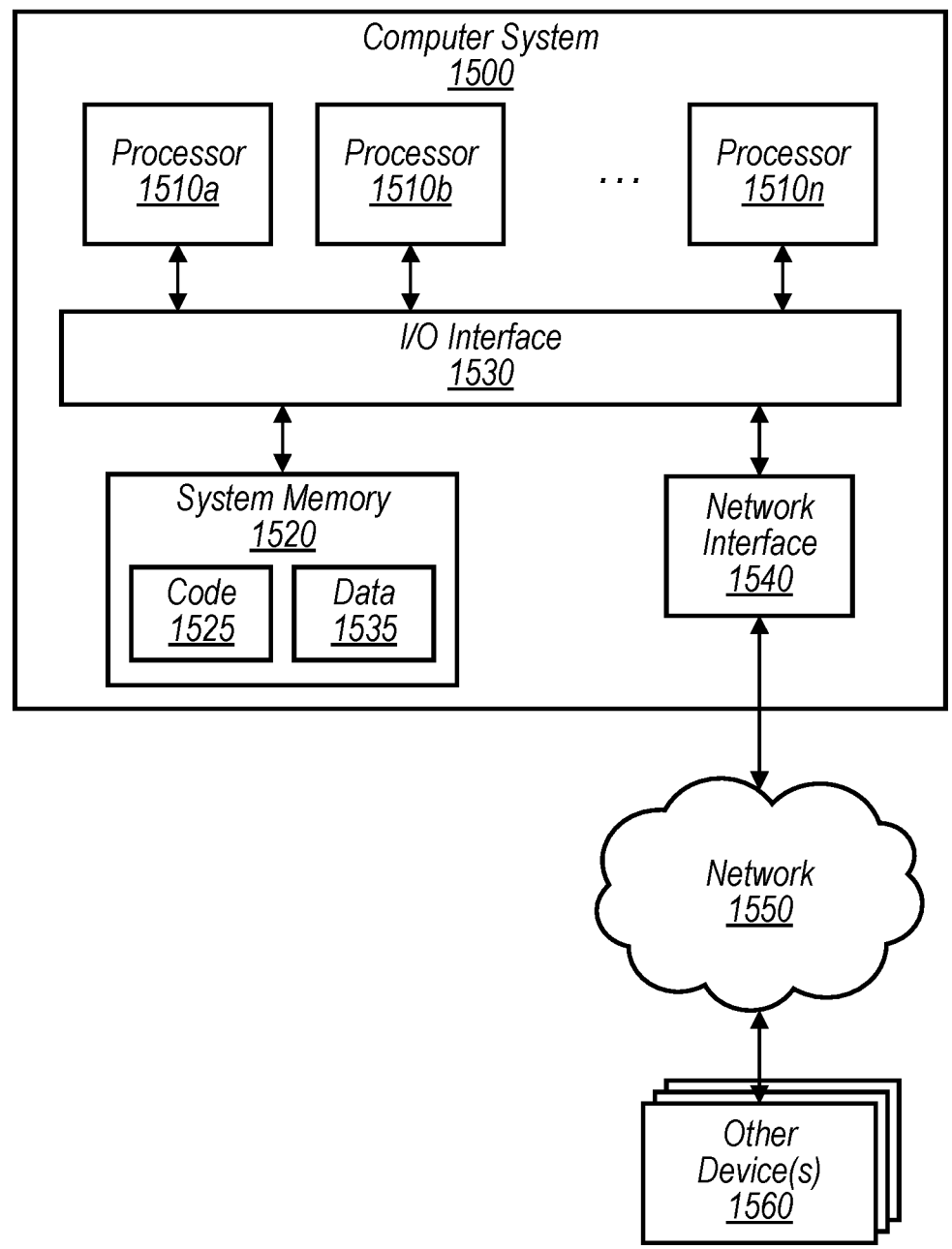
FIG. 15 is a block diagram illustrating an example computer system that implements some or all of the techniques described herein, according to some embodiments.

Any of various computer systems may be configured to implement processes associated with a synthetic sensor service, a synthetic sensor orchestration environment, an in-vehicle distributed computing environment, an ECU, a provider network that implement a synthetic sensor service, an operating system in a vehicle or device, or any other component of the above figures. For example, FIG. 15 is a block diagram illustrating an example computer system that implements some or all of the techniques described herein, according to some embodiments. In various embodiments, the synthetic sensor service, synthetic sensor orchestration environment, the provider network that implement the synthetic sensor service and other cloud services, the operating system in a vehicle or device, or any other component of the above figures FIGS. 1-14 may each include one or more computer systems 1400 such as that illustrated in FIG. 15.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530. In some embodiments, computer system 1500 may be illustrative of servers implementing enterprise logic or downloadable application, while in other embodiments servers may include more, fewer, or different elements than computer system 1500.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set architectures (ISAs), such as the x86, PowerPC, SPARC, or MIPS ISAs, or any other suitable ISA. In some embodiments, processors 1510A-1510N may include specialized processors such as graphics processing units (GPUs), application specific integrated circuits (ASICs), etc. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1526.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, I/O interface 1530 may include support for devices attached via an automotive CAN bus, etc. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 attached to a network or networks 1550. In various embodiments, network interface 1540 may support communication via any suitable wired or wireless general data networks, such as types of Ethernet networks, cellular networks, Bluetooth networks, Wi-Fi networks, Ultra-wide-band Networks, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a plurality of electronic control units (ECUs) installed, or configured to be installed, in a vehicle, wherein one or more of the ECUs store program instructions for implementing an in-vehicle distributed computing environment, configured to:
      receive a synthetic sensor package for deployment in the vehicle, wherein the synthetic sensor package comprises:
         logic for a synthetic sensor and mappings for the synthetic sensor;
      determine a placement location for the synthetic sensor, based on:
         respective availabilities of data inputs for the mappings of the synthetic sensor package at respective ones of the ECUs; and
         respective resource capacities of the respective ones of the ECUs to execute the logic included in the synthetic sensor package; and
      place the synthetic sensor as two or more modular components placed on two or more different ones of the respective ones of the ECUs, wherein the two or more modular components collectively implement the synthetic sensor in the in-vehicle distributed computing environment.

2. The system of claim 1, wherein the two or more modular components of the synthetic sensor comprise:

a logic portion placed at a first one of the two or more different ones of the respective ones of the ECUs; and
an input portion placed at a second one of the two or more different ones of the respective ones of the ECUs,
wherein the logic portion and the input portion execute in a run-time environment of the in-vehicle distributed computing environment.

3. The system of claim 2, wherein the input portion is configured to:
receive information from one or more data sources at the second one of the two or more different ones of the respective ones of the ECUs via:
a platform abstraction layer;
a hardware abstraction layer; or
a vehicle abstraction layer; and
provide the information from the one or more data sources at the second one of the two or more ECUs to the logic portion at the first one of the two or more ECUs via a communication layer of the in-vehicle distributed computing environment.

4. The system of claim 1, wherein the in-vehicle distributed computing environment, is further configured to:
receive an other synthetic sensor package for deployment in the vehicle, wherein the other synthetic sensor package comprises logic for another synthetic sensor and mappings for the other synthetic sensor;
determine another placement location for the other synthetic sensor, based on:
additional respective availabilities of data inputs for the mappings of the other synthetic sensor package at the respective ones of the ECUs; and
additional respective resource capacities of the respective ones of the ECUs to execute the logic of the other synthetic sensor package; and
place the other synthetic sensor at the other determined placement location on a single one of the ECUs.

5. The system of claim 1, wherein in the in-vehicle distributed computing environment comprises:
an orchestration component configured to determine placements for one or more synthetic sensors based on current capacities or capabilities of the ECUs and based on the respective availability of data inputs at the respective ones of the ECUs;
a runtime environment within which respective modular components of the one or more synthetic sensors execute;
a monitoring component configured to implement standardized interfaces for collecting capacity or capability information from the respective ones of the ECUs; and
a communication layer configured to format communications according to one or more protocols of the in-vehicle distributed computing environment.

6. One or more non-transitory, computer-readable, media storing program instructions, that when executed, on or across, one or more processors, cause the one or more processors to:
implement an in-vehicle distributed computing environment, configured to:
receive a synthetic sensor package for deployment in a vehicle, wherein the synthetic sensor package comprises:
logic for a synthetic sensor and mappings for the synthetic sensor; and
determine a placement location for the synthetic sensor, based on:
respective availabilities of data inputs for the mappings of the synthetic sensor package at respective placement locations in the in-vehicle distributed computing environment; and
respective resource capacities or capabilities of the respective placement locations in the in-vehicle distributed computing environment; and
place the synthetic sensor as two or more modular components placed at two or more different ones of the respective placement locations in the in-vehicle distributed computing environment, wherein the two or more modular components collectively implement the synthetic sensor in the in-vehicle distributed computing environment.

7. The one or more non-transitory, computer-readable, media of claim 6, wherein the in-vehicle distributed computing environment is further configured to:
receive an other synthetic sensor package for deployment in the vehicle, wherein the other synthetic sensor package comprises logic and mappings;
determine, whether the other synthetic sensor is to be placed in a single placement location as an undivided synthetic sensor, or is to be placed in the two or more different ones of the respective placement locations as the two or more modular components of the other synthetic sensor; and
based on the determination,
place the other synthetic sensor as the undivided synthetic sensor in the single placement location in the in-vehicle distributed computing environment; or
place the other synthetic sensor as the two or more modular components placed at the two or more different ones of the respective placement locations in the in-vehicle distributed computing environment.

8. The one or more non-transitory, computer-readable, media of claim 6, wherein the respective placement locations in the in-vehicle distributed computing environment comprise different respective electronic control units (ECUs) in the vehicle.

9. The one or more non-transitory, computer-readable, media of claim 8, wherein the different respective ECUs have different respective resource capacities or capabilities, based at least in part on:
different respective types of processors included in the different respective ECUs; or
different numbers of the processors included in the different respective ECUs.

10. The one or more non-transitory, computer-readable, media of claim 9, wherein the different respective ECUs having the different respective types of the processors comprise different ones of:
a central processing unit (CPU);
a graphics processing unit (GPU); or
a general purpose graphics processing unit (GPGPU).

11. The one or more non-transitory, computer-readable, media of claim 8, wherein the different respective ECUs have different respective availabilities of data inputs, based at least in part on:
a vehicle domain in which a given one of the different respective ECUs is located; or
sensor data provided to the given one of the different respective ECUs from sensors connected to the given one of the different respective ECUs.

12. The one or more non-transitory, computer-readable, media of claim 6, wherein the two or more modular components of the synthetic sensor, comprise:
at least one logic portion; and
at least one input portion, wherein the at least one input portion is configured to:
receive information from one or more data sources at a data source placement location via:
a platform abstraction layer;
a hardware abstraction layer; or
a vehicle abstraction layer; and
provide the information from the one or more data sources at the data source placement location of the at least one input portion to the at least one logic portion at a different placement location via a communication layer of the in-vehicle distributed computing environment.

13. The one or more non-transitory, computer-readable, media of claim 12, wherein the two or more modular components of the synthetic sensor, further comprise:
an additional input portion placed at a third placement location,
wherein the at least one input portion is placed at a second placement location,
wherein the at least one input portion and the additional input portion provide information from data sources at the second placement location and the third placement location to the at least one logic portion placed at a first placement location.

14. The one or more non-transitory, computer-readable, media of claim 12, wherein the at least one logic portion comprises:
a first portion placed at the placement location comprising an electronic control unit (ECU) having a first type of processor: and
a second portion placed at another placement location comprising a different electronic control unit (ECU) having a second type of processor,
wherein the first and second portions of the at least one logic portion and the at least one input portion execute in a run-time environment of the in-vehicle distributed computing environment.

15. The one or more non-transitory, computer-readable, media of claim 6, wherein the in-vehicle distributed computing environment is configured to:
provide a uniform deployment environment for synthetic sensors for deployment in:
a plurality of vehicles manufactured by the plurality of different manufactures;
a plurality of vehicle components manufactured by different manufacturers; or
the plurality of vehicles manufactured by the plurality of different vehicle manufacturers, each comprising the plurality of vehicle components manufactured by the plurality of different manufacturers.

16. The one or more non-transitory, computer-readable, media of claim 6, wherein the in-vehicle distributed computing environment, comprises:
a first runtime environment; and
a second runtime environment, wherein the second runtime environment is configured to comply with one or more safety standards, such that synthetic sensors placed in the second runtime environment satisfy the one or more safety standards.

17. The one or more non-transitory, computer-readable, media of claim 6, wherein available placement locations for the synthetic sensor, further comprise:
another placement location at a virtual electronic control unit (vECU) implemented on hardware external to the vehicle and connected to the vehicle via a network connection.

18. The one or more non-transitory, computer-readable, media of claim 6, wherein the in-vehicle distributed computing environment, is further configured to:
in response to failure of an electronic control unit (ECU) in the vehicle,
implement the synthetic sensor at another non-failed ECU in the vehicle, wherein the implemented synthetic sensor comprises a logic portion that carries out tasks previously performed by the failed ECU.

19. The one or more non-transitory, computer-readable media of claim 18, wherein the synthetic sensor carrying out the tasks previously performed by the failed ECU prevents interruption of operation of the vehicle for at least a threshold amount of time or distance.

20. The one or more non-transitory, computer-readable, media of claim 6, wherein the in-vehicle distributed computing environment is further configured to:
automatically relocate the synthetic sensor or the two or more modular components of the synthetic sensor to another placement location in response to a change in the in-vehicle distributed computing environment.

21. The one or more non-transitory, computer-readable, media of claim 20, wherein the change in the in-vehicle distributed computing environment comprises one or more of:
an addition of another synthetic sensor;
a change in availability of an existing or additional input to the synthetic sensor;
a modification of a certification level of the synthetic sensor; or
the change in resource availability at the placement location or a change in the resource availability at an alternative placement location.

22. A method, comprising:
receiving a synthetic sensor package at an in-vehicle distributed computing environment of a vehicle, wherein the synthetic sensor package comprises:
logic for a synthetic sensor and a mapping for the synthetic sensor;
determining a placement location for the synthetic sensor, based on:
respective availabilities of data inputs for the mapping of the synthetic sensor at respective placement locations in the in-vehicle distributed computing environment; and
respective resource capacities of the respective placement locations in the in-vehicle distributed computing environment; and
placing the synthetic sensor as two or more modular components placed at two or more different ones of the respective placement locations in the in-vehicle distributed computing environment, wherein the two or more modular components collectively implement the synthetic sensor in the in-vehicle distributed computing environment.

* * * * *